United States Patent
Endo et al.

(10) Patent No.: US 6,275,494 B1
(45) Date of Patent: Aug. 14, 2001

(54) PACKET SWITCHING SYSTEM, PACKET SWITCHING NETWORK AND PACKET SWITCHING METHOD

(75) Inventors: Noboru Endo, Kodaira; Akihiko Takase, Suginami-ku; Hajime Abe, Yokohama; Kazuho Miki, Kokubunji, all of (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 09/079,150

(22) Filed: May 15, 1998

(30) Foreign Application Priority Data

May 19, 1997 (JP) .................................. 9-128278

(51) Int. Cl.[7] .................................. H04J 3/16

(52) U.S. Cl. .................... 370/395; 370/401; 370/466; 370/470; 370/474

(58) Field of Search ........................... 370/395, 396, 370/397, 398, 399, 409, 465, 466, 467, 469, 470, 471, 474, 401, 402, 403, 404, 405

(56) References Cited

U.S. PATENT DOCUMENTS

| | | | |
|---|---|---|---|
| 5,420,858 | * 5/1995 | Marshall et al. | 370/395 |
| 5,452,296 | 9/1995 | Shimizu | 370/60.1 |
| 5,463,621 | * 10/1995 | Suzuki | 370/399 |
| 5,467,349 | 11/1995 | Huey et al. | 370/60.1 |
| 5,809,025 | * 9/1998 | Timbs | 370/397 |
| 5,946,313 | * 8/1999 | Allan et al. | 370/397 |

FOREIGN PATENT DOCUMENTS 8125692  5/1996  (JP) .................. H04L/12/66

OTHER PUBLICATIONS

P. Newman, et al, "Flow Labelled IP: A Connectionless Approach to ATM" Proc. IEEE Infocom, Mar. 1996, pp. 1–10.

C. Hou, Routing Virtual Circuits with Timing Requirements in Virtual Path Based ATM Networks, Department of Electrical and Computer Engineering, The University of Wisconsin, Mar. 24, 1996, pp. 320–328.

P. Newman, et al, "IP Switching and Gigabit Routers", IEEE Communications Magazine, Jan. 1997, pp. 64–69.

H. Schneider, "The Concept of Virtual Paths and Virtual Channels in ATM–Networks", X000315092, Mar. 3, 1990, pp. 63–72.

H. Esaki, et al, "High Speed Datagram Delivery over Internet Using ATM Technology" IEICE Trans. Commun. vol. E78–B, No. 8, Aug. 1995, pp. 1208–1217.

G. Chandranmenon et al, "Trading Packet Headers for Packet Processing", IEEE/ACM, Transactions on Networking, vol. 4, No. 2, Apr. 1996, pp. 141–152.

* cited by examiner

Primary Examiner—Douglas Olms
Assistant Examiner—Shick Hom
(74) Attorney, Agent, or Firm—Antonelli, Terry, Stout & Kraus, LLP

(57) ABSTRACT

Upon initialization, a VPC is set up between edge nodes. A control processor of each node creates an IP address/VPC mapping table using IP routing information and an address mapping table mapping correspondence between IP addresses and ATM addresses and supplied by a network management system. A gateway assigns a VCC to each packet input to the network. A sending-side edge node inputs the packet to the VPC corresponding to its destination by referring to the IP address/VPC mapping table. A transit node performs packet switching over VP. A receiving-side edge node transfers each packet to the gateway corresponding to its destination. If a series of packets meet a predetermined condition in a given edge node, its control processor sends VCC information to input interfaces of the edge node so that the packets are switched by an ATM switch in the edge node without intervention of the control processor.

9 Claims, 16 Drawing Sheets

| INPUT VPI | INPUT VCI | VP SWITCH FLAG | OUTPUT INTERFACE NUMBER | OUTPUT VPI | OUTPUT VCI | NUMBER OF ARRIVAL CELLS |
|---|---|---|---|---|---|---|
| | | | | | | |
| | | | | | | |
| | | | | | | |

| DESTINATION IP ADDRESS (941) | SOURCE IP ADDRESS (942) | PORT NUMBER (943) | VPC IDENTIFIER (944) | OUTPUT INTERFACE NUMBER (945) | OUTPUT VPI (946) | OUTPUT VCI (947) | STATUS (948) |
|---|---|---|---|---|---|---|---|
| | | | | | | | |
| | | | | | | | |
| | | | | | | | |

| DESTINATION IP ADDRESS (951) | PORT NUMBER (952) | MASK (956) | VPC IDENTIFIER (953) | OUTPUT INTERFACE NUMBER (954) | OUTPUT VPI (955) |
|---|---|---|---|---|---|
| | | | | | |
| | | | | | |
| | | | | | |

| ATM ADDRESS 961 | VPC IDENTIFIER 962 | OUTPUT INTERFACE NUMBER 963 | OUTPUT VPI 964 | NUMBER OF IDLE VCI 965 | DEFAULT VCI 966 | IDLE VCI POINTER 967 |
|---|---|---|---|---|---|---|
| | | | | | | |
| | | | | | | |
| | | | | | | |

| RECEIVED VPI 971 | RECEIVED VCI 972 | INPUT INTERFACE NUMBER 973 | INPUT VPI 974 | INPUT VCI 975 | STATUS 976 | FLOW POINTER 977 |
|---|---|---|---|---|---|---|
| | | | | | | |
| | | | | | | |
| | | | | | | |

| OUTPUT INTERFACE NUMBER (981) | IDLE VPI POINTER (982) |
|---|---|
|  |  |
|  |  |
|  |  |

| DESTINATION ATM ADDRESS (991) | NEXT HOP ATM ADDRESS (992) | OUTPUT INTERFACE NUMBER (993) | OUTPUT VPI (994) | OUTPUT VCI (995) |
|---|---|---|---|---|
|  |  |  |  |  |
|  |  |  |  |  |
|  |  |  |  |  |

| IP ADDRESS (111) | ATM ADDRESS (112) |
|---|---|
|  |  |
|  |  |
|  |  |

| VPI | NUMBER OF IDLE VCIS | DEFAULT VCI | IDLE VCI POINTER |
|---|---|---|---|
|  |  |  |  |
|  |  |  |  |
|  |  |  |  |

FIG. 25

| DESTINATION IP ADDRESS | SOURCE IP ADDRESS | PORT NUMBER | OUTPUT VPI | OUTPUT VCI | STATUS |
|---|---|---|---|---|---|
|  |  |  |  |  |  |
|  |  |  |  |  |  |
|  |  |  |  |  |  |

PACKET SWITCHING SYSTEM, PACKET SWITCHING NETWORK AND PACKET SWITCHING METHOD

BACKGROUND OF THE INVENTION

The present invention relates to a packet switching system and, more particularly, to a packet switching system which, in sending and receiving packets over ATM (Asynchronous Transfer Mode) lines, switches the packets based on the IP (Internet Protocol) routing protocol.

Recent years have seen a surge in traffic of packet communications based on the IP thanks in part to the introduction of novel applications such as the WWW (World Wide Web). IP packet switching was carried out conventionally on a packet-by-packet basis with reference to a routing table prepared according to the IP routing protocol. The switching was conducted primarily by software, and it was desired to increase the speed of the processing in the face of an ever-swelling volume of traffic.

One way to address the need for high-speed processing has been proposed in the form of a packet switching system by P. Newman, et al. "Flow Labeled IP: A Connectionless Approach ATM", Proc. IEEE Infocom, March 1996, pp. 1–10 and Japanese Patent Laid-open (Kokai) No. Hei 8-125692. The proposed packet switching system combines two processes: packet-by-packet processing based on a routing table, and processing of individual ATM cells using ATM switches.

The above packet switching system has a packet processor called IP controller connected to each input/output line of an ATM switch. When IP packets arrive in the form of assembled ATM cells, the cells are sent to the IP controller for a while via the ATM switch. The IP controller reassembles the cells to a IP packet. The destination of each packet to which the cells are reassembled is decided by referring to a routing table as has been done conventionally. The cells are again assembled from the packet and sent via the ATM switch to the output lines bound for their destinations.

If a specific condition is met (e.g., if a predetermined number of packets having the same part of header have arrived), the IP controller allocates a dedicated VC (Virtual Channel) to the packets that were hitherto multiplexed on the same VC as other IP packets. The IP controller then informs the input interface in the ATM switch of a VPI (Virtual Path Identifier) and a VCI (Virtual Channel Identifier) of the input line for the IP packets in question, as well as an output line number and a VPI and a VCI of the output line.

Thereafter, of the IP packets that have arrived at the input interface, those whose headers are partially the same (this group of packets is called a flow hereunder), are switched in the form of ATM cells by the ATM switch without passing through the IP controller. The switched IP packets are placed onto the output line bound for the destination (this operation is called a cut-through hereunder). This eliminates the need for having to switch each packet by referring to the routing table, whereby high-speed packet switching based on the ATM switch is implemented.

Conventionally, it has been necessary for a plurality of packet switching systems to allocate dedicated VCs therebetween for each flow of packets when carrying out a cut-through. Therefore, where large quantities of packets need to be processed, the resource allocation becomes a bottleneck. The following is a list of problems to be solved in conventional apparatus:

(1) Throughput is limited.
(2) The input interface of each ATM switch needs to have connection information set for each flow. Under size constraints of the table permitted for the input interface, only a limited number of flows is handled by cut-through operations.
(3) Delays in the dedicated VC resource allocation prevent the cut-through from providing any appreciable improvement in performance for packet transfers of short holding times.
(4) Where packets are transferred through a plurality of packet switching systems connected in a multi-stage structure, no significant improvement in performance is attained if none of the switching systems performs a cut-through.

On the other hand, a way to provide an idle VC table for retrieving unused VCIs and set a direct channel for transmitting and receiving ATM cells sharing the same destination by setting VCs corresponding to transmission demand has been proposed by U.S. Pat. No. 5,452,296. This way brings realizing a cut-through action in the inside of the ATM switching system and lessen a switching delay. However, since the direct channel is not set in each switching system without a setting time, there is still the problem to be solved that there is little effect of lessening a total switching delay in the entire switching network.

SUMMARY OF THE INVENTION

It is therefore an object of the present invention to provide a large-capacity packet switching system which has only small delays in cut-through and has limited constraints on the number of flows that can be handled by the cut-through action.

In carrying out the invention and according to one aspect thereof, there is provided a packet switching system including: switching means accommodating a plurality of input/output ATM lines; packet destination determining means for determining the destination of a packet on a routing protocol; packet reassembling means for reassembling ATM cells to a packet; cell assembling means for assembling ATM cells from a packet; VPC (Virtual Path Connection) setting means for setting up a VPC among the packet switching systems; and VCC (Virtual Channel Connection) allocating means for allocating an idle VCC existing in the VPC to packets sharing the same part of header.

The packet switching system may include input and output interfaces, an ATM switch and a control processor. The ATM switch includes the above-mentioned switching means, and the control processor includes the remaining means. The input interface is located between the input ATM line connected to the packet switching system and the ATM switch. The output interface is located between the output ATM line connected to the packet switching system and the ATM switch. The input interface changes incoming ATM cells from the input ATM line into internal cells and forwards them to the ATM switch. The output interface turns the internal cells from the ATM switch into ATM cells and sends them to the output ATM line. In the description that follows, packet switching systems located at the input/output parts, namely the peripheral part, of a network will be called edge nodes, and packet switching systems positioned at the transit points, namely the inner part, of the network will be called transit nodes.

Gateways are provided between each of the input and output points of the network and the edge nodes. The gateway located at the input part turns incoming packets from the input point of the network into ATM cells and sends the cells to the edge node located at the input part. In the description that follows, the gateway at the input part will be called a sending-side gateway, and the edge node at the input part will be called a sending-side edge node. The gateway located at the output part turns the ATM cells received from the edge node located at the output part into packets and forwards the packets to the output point of the network. In the description that follows, the gateway at the output part will be called a receiving-side gateway, and the edge node at the output part will be called a receiving-side edge node.

Since a VPC is assigned up among packet switching systems by the invention, the transit node performs VP (Virtual Path) switching only and does not perform VC switching. Thus produces VCCs provided in the VPC are unchanged. Therefore, large capacity switching can be realized in the transit switching system thanks to few constrains on the number of flows.

Further, since packets sharing the same part of header are allocated to a VCC and treated collectively, then an easy cut-through can be realized.

It is desired that the packet switching system of the invention has mapping means for mapping correspondence between a packet destination and a VPC. This produces an effect of rapid setting of a VPC.

Moreover, it is desired that the packet switching system of the invention switches the second and subsequent packets of the packets sharing the same part of header without intervention of the packet destination determining means after having transferred the first packet by use of the packet destination determining means. This produces an actual cut-through.

According to the invention, the control processor of the sending-side edge node manages the VCCs in the VPC established between edge nodes. Each series of IP packets sharing the same part of header and sent from the sending-side gateway is transferred over a different VCC. Therefore, when the first packet of a series of packets is allocated an idle VCC, the need to report this VCC to the receiving-side edge node is eliminated. Hence the ability to perform cut-through at high speed, i.e., rapidly to switch routes at the edge node (to process the first packet followed by transfer of the second and subsequent packets by the switching unit alone).

The inventive constitution permits allocating a VCC to each flow, i.e., a series of packets sharing the same part of header. Unlike conventional arrangements requiring packet switching systems to allocate a dedicated VC to each flow therebetween, the packet switching system of the invention implements the cut-through by simply making necessary internal settings. This significantly reduces delays in cut-through operations.

Further, since VCCs set in the direction of an receiving-side edge node are multiplexed collectively in a VPC, there is no need to set up switching information about each VCC as has been the case conventionally. Switching information about the VPC multiplexing VCCs need only be established, therefore an appreciable increase in the number of VCCs switched by the transit node can be realized.

According to another aspect of the invention, there is provided a packet switching network including a first packet switching system (edge node) and a second packet switching system (transit node). The first packet switching system includes switching means accommodating a plurality of input/output ATM lines; packet destination determining means for determining a destination of a packet on a routing protocol; packet reassembling means for reassembling ATM cells to a packet; cell assembling means for assembling ATM cells from a packet; VPC setting means for setting up a VPC among the packet switching systems; mapping means for mapping correspondence between a packet destination address and the VPC; and VCC allocating means for allocating an idle VCC existing in the VPC to packets sharing the same part of header. The second packet switching system includes switching means accommodating a plurality of input/output ATM lines; and VPC setting means for setting up a VPC among the packet switching systems. At least one transit second packet switching system is furnished between a sending-side first packet switching system and a receiving-side first packet switching system.

Over the inventive packet switching network, the sending-side first packet switching system inputs packets to VPCs, the transit second packet switching system performs VP (Virtual Path) switching, and the receiving-side first packet switching system switches packets on a flow-by-flow basis. The arrangement allows the transit second packet switching system, in which a large number of packets are concentrated, to switch numerous flows using a single VPC.

These and other objects and many of the attendant advantages of the invention will be readily appreciated as the same becomes better understood by reference to the following detailed description when considered in connection with the accompanying drawings.

BRIEF DESCRIPTION OF THE DRAWINGS

FIG. 10 is a schematic view of a transit flow management table included in the control processor of FIG. 8;

FIG. 11 is a schematic view of an IP address/VPC mapping table included in the control processor of FIG. 8;

FIG. 12 is a schematic view of a VPC management table included in the control processor of FIG. 8;

FIG. 13 is a schematic view of an input/output VPI/VCI mapping table included in the control processor of FIG. 8;

FIG. 14 is a schematic view of an idle VPI management table included in the control processor of FIG. 8;

FIG. 15 is a schematic view of an ATM routing table included in the control processor of FIG. 8;

FIG. 16 is a schematic view of an IP address/ATM address mapping table included in the control processor of FIG. 8;

FIG. 24 is a schematic view of an idle VCI management table included in the gateway of FIG. 23;

FIG. 25 is a schematic view of an input flow management table included in the gateway of FIG. 23.

DETAILED DESCRIPTION OF THE PREFERRED EMBODIMENTS

Preferred embodiments of this invention will now be described with reference to the accompanying drawings.

Figure 2:
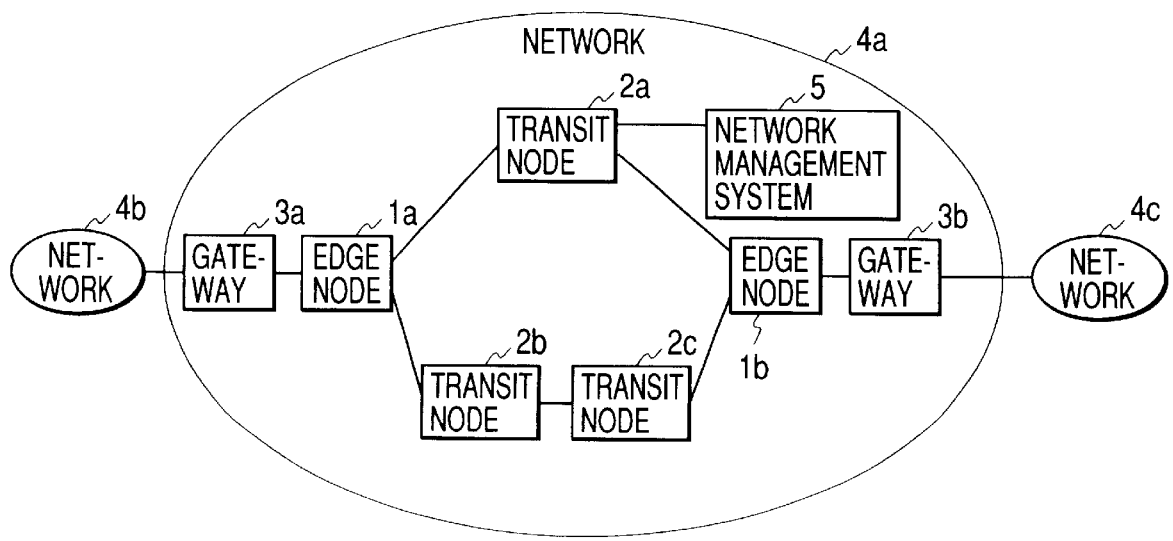
FIG. 2 is a system block diagram of a network constitution to which the invention is applied.

FIG. 2 shows a typical network constitution to which the invention is applied. In FIG. 2, reference numerals 1a and 1b stand for edge nodes; 2a, 2b and 2c for transit nodes; 3a and 3b for gateways; 4a, 4b and 4c for networks; and 5 for a network management system.

Figure 1:
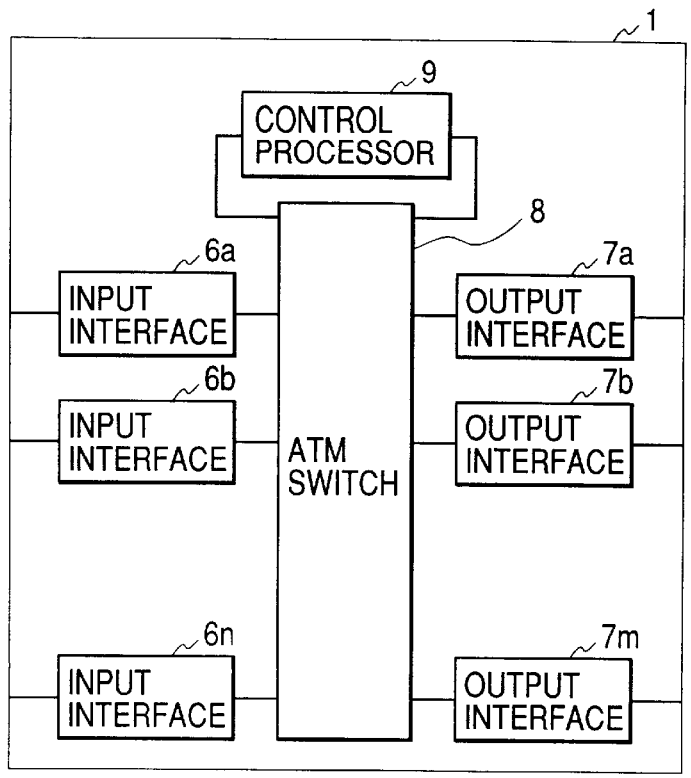
FIG. 1 is a block diagram of a typical edge node.

FIG. 1 depicts a typical constitution of the edge node 1 (1a, 1b). In FIG. 1, reference numeral 6 (6a, 6b, ..., 6n) stands for an input interface, 7 (7a, 7b, ..., 7m) for an output interface, 8 for an ATM switch, and 9 for a control processor.

Figure 3:
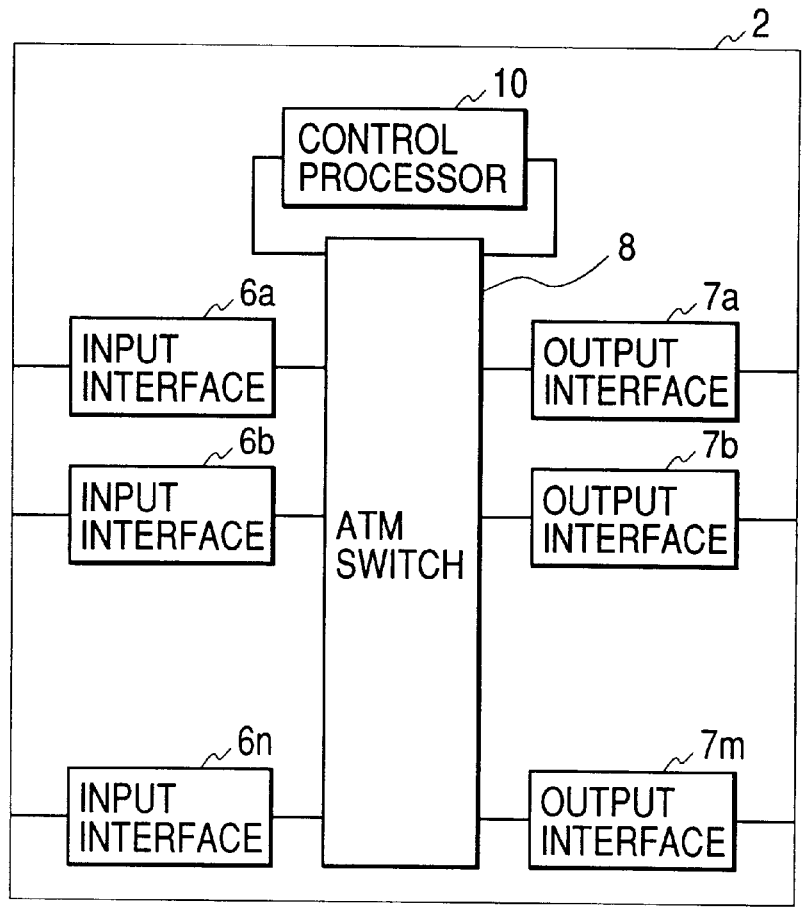
FIG. 3 is a block diagram of a typical transit node.

FIG. 3 illustrates a typical constitution of the transit node 2 (2a, 2b, 2c). In FIG. 3, reference numeral 6 (6a, 6b, ..., 6n) stands for an input interface, 7 (7a, 7b, ..., 7m) for an output interface, 8 for an ATM switch, and 10 for a control processor.

Figure 4:
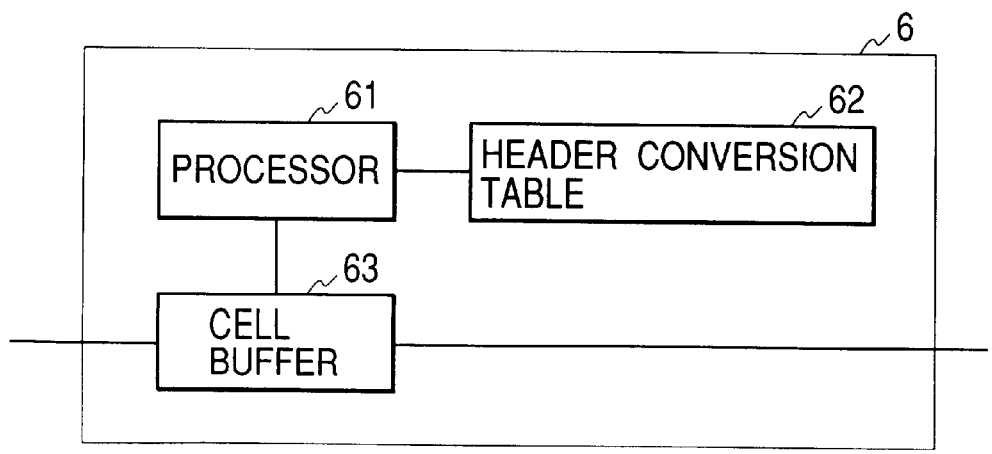
FIG. 4 is a block diagram of an input interface included in the edge node of FIG. 1.

FIG. 4 shows a typical constitution of the input interface 6 (6a, 6b, ..., 6n). In FIG. 4, reference numeral 61 stands for a processor, 62 for a header conversion table, and 63 for a cell buffer.

Figures 5, 6:
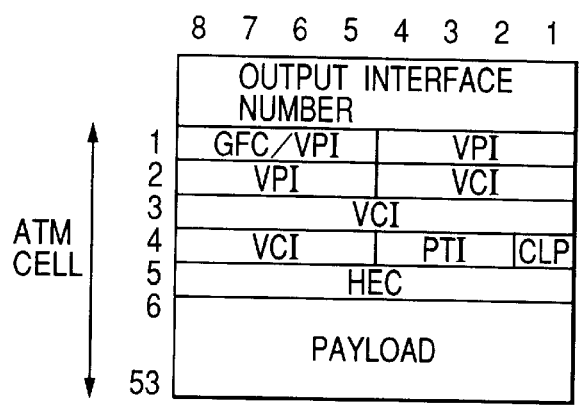
FIG. 5 is a schematic view of a header conversion table included in the interface of FIG. 4.
FIG. 6 is a schematic view of an internal cell format.

FIG. 5 outlines a typical constitution of the header conversion table 62. In FIG. 5, reference numeral 621 stands for an input VPI, 622 for an input VCI, 623 for a VP switch flag, 624 for an output interface number, 625 for an output VPI, 626 for an output VCI, and 627 for the number of arrival cells.

FIG. 6 depicts a typical format of an internal cell. An internal cell is constructed with an output interface number added to its top.

Figure 7:
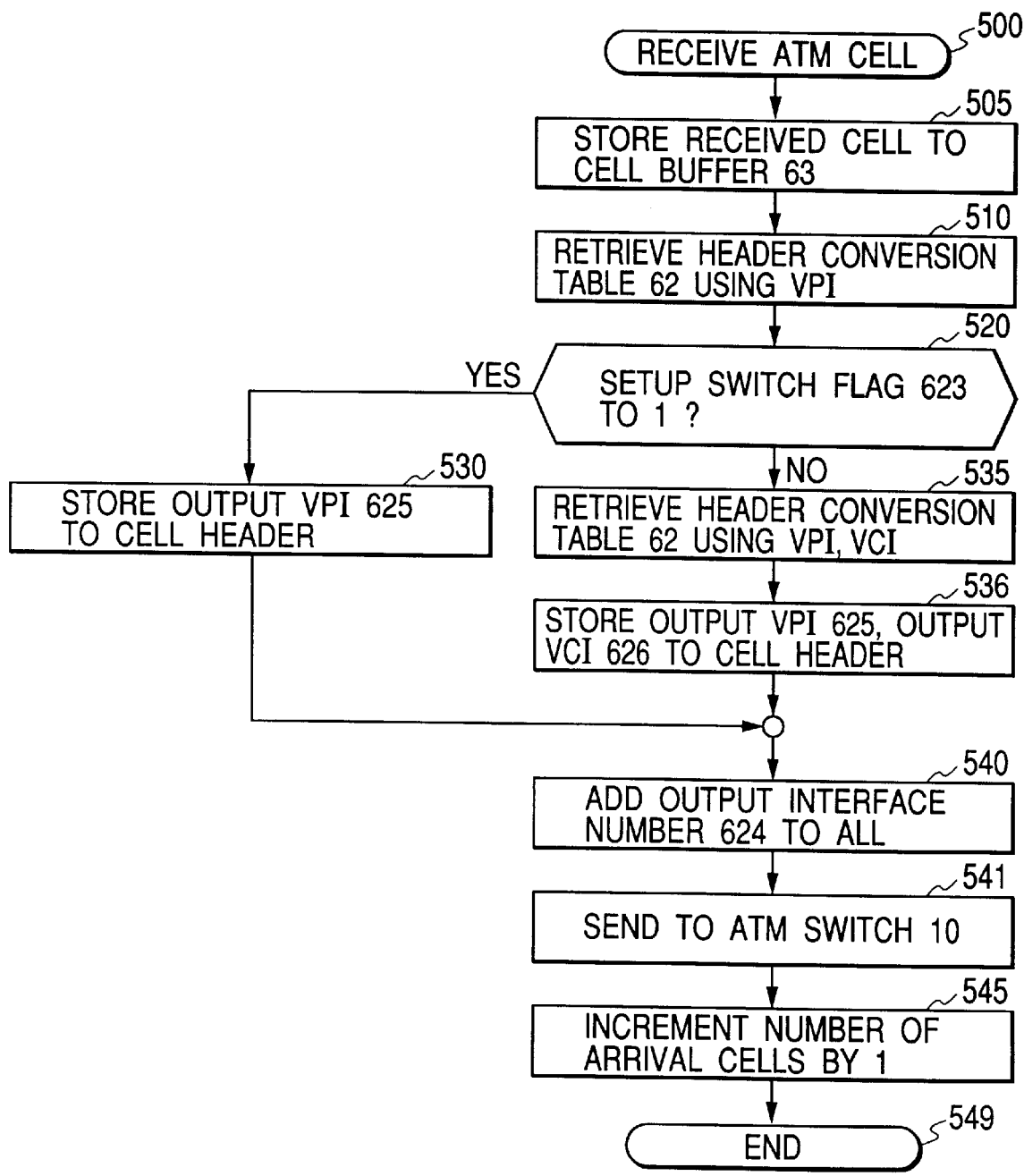
FIG. 7 is a flowchart of steps performed by the input interface of FIG. 4, detailing a cell process thereby.

How each cell is processed by the input interface 6 will now be described with reference to FIG. 7. After receiving an ATM cell (step 500), the input interface 6 stores the received cell in a cell buffer 63 (see FIG. 4) (step 505). The processor 61 retrieves the header conversion table 62 using the VPI in the header as a key (step 510), and checks the VP switch flag 623 (see FIG. 5) (step 520).

If the VP switch flag 623 is found to be 1, the received ATM cell should be switched over VP. In that case, the processor 61 (see FIG. 4) reads out the output interface number 624 and output VPI 625, substituting the output VPI 625 for the VPI in the header of the received ATM cell (step 530). The processor 61 adds the output interface number 624 to the cell (step 540) to create an internal cell, sends the cell to the ATM switch (step 541), and increments by one the number of arrival cells 627 (see FIG. 5) (step 545) in the matching entry of the applicable ATM cell in the header conversion table 62 (see FIG. 4).

If the VP switch flag 623 is found to be 0, the received ATM cell should be switched over VC. In this case, the processor 61 retrieves again the header conversion table 62 using a VPI-VCI pair (step 535). The processor 61 reads out the output interface number 624, output VPI 625 and output VCI 626 to substitute the output VPI 625 and output VCI 626 respectively for the VPI and VCI in the header of the received ATM cell (step 536), and adds the output interface number 624 to the ATM cell (step 540).

The processor 61 creates an internal cell in the manner described above, sends the internal cell to the ATM switch 8 (step 541), and increments by one the number of arrival cells 627 (step 545) in the matching entry of the applicable ATM cell in the header conversion table 62.

The input interface 6 checks periodically the number of arrival cells 627 in each entry of the header conversion table 62. If the number of arrival cells in any entry is found to be 0, the input interface 6 informs the control processor 9 of the applicable input interface number, input VPI, input VCI, and VP switch flag 623. If the number of arrival cells 627 is found to be 1 or larger, the number is reset to 0.

The ATM switch 8 (see FIG. 1) forwards the internal cell to an output interface 7 of the destination on the basis of the output interface number 624 added to the cell by the input interface 6. The output interface 7 deletes the output interface number from the internal cell before transferring the ATM cell to the next node.

Figure 8:
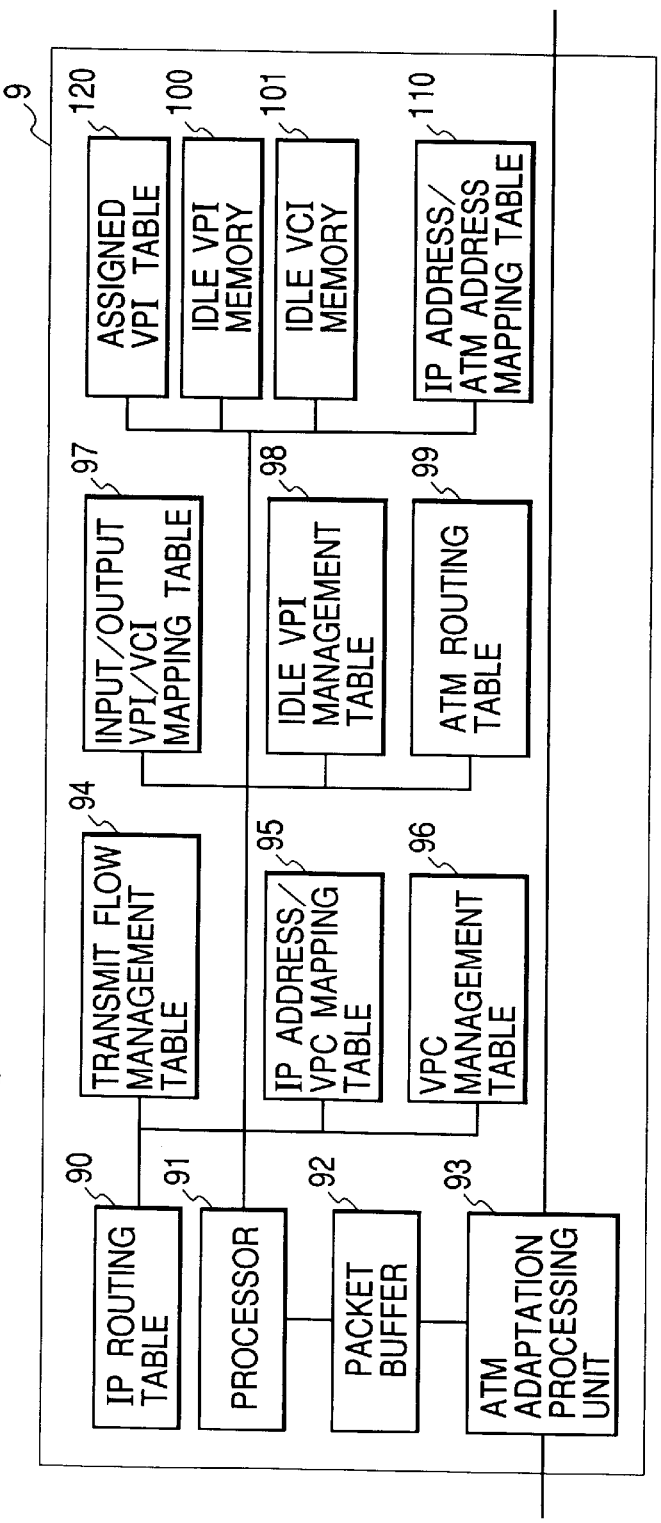
FIG. 8 is a block diagram of a control processor included in the edge node of FIG. 1.

FIG. 8 shows a typical constitution of the control processor 9. In FIG. 8, reference numeral 90 stands for an IP routing table, 91 for a processor, 92 for a packet buffer, 93 for an ATM adaptation processing unit, 94 for a transit flow management table, 95 for an IP address/VPC mapping table, 96 for a VPC management table, 97 for an input/output VPI/VCI mapping table, 98 for an idle VPI management table, 99 for an ATM routing table, 100 for an idle VPI memory, 101 for an idle VCI memory, 110 for an IP address/ATM address mapping table, and 120 for an assigned VPI table.

Figure 9:
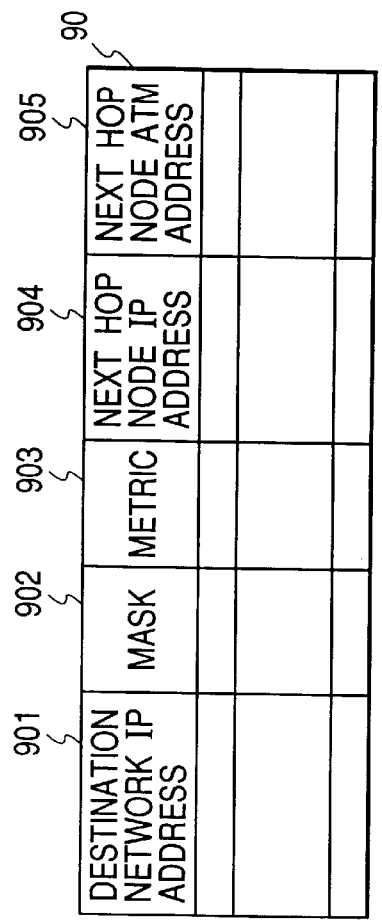
FIG. 9 is a schematic view of an IP routing table included in the control processor of FIG. 8.

FIG. 9 depicts a typical constitution of the IP routing table 90. In FIG. 9, reference numeral 901 stands for a destination network IP address, 902 for a mask, 903 for a metric, 904 for a next hop node IP address, and 905 for a next hop node ATM address.

FIG. 10 outlines a typical constitution of the transit flow management table 94. In FIG. 10, reference numeral 941 stands for a destination IP address, 942 for a source IP address, 943 for a port number, 944 for A VPC identifier, 945 for an output interface number, 946 for an output VPI, 947 for an output VCI, and 948 for status.

Further, the port number is given to each packet in TCP/IP (Transmission Control Protocol/IP) protocol or UDP/IP (User Datagram Protocol/IP) protocol so as to identify a higher rank application which uses the carrying service for the each packet. However, the invention is not limited to the port number but can adopt an application identifier to identify an application for general packets including the IP packet. The port number is a kind of the application identifier.

FIG. 11 shows a typical constitution of the IP address/ VPC mapping table 95. In FIG. 11, reference numeral 951 stands for a destination IP address, 952 for a port number, 953 for a VPC identifier, 954 for an output interface number, and 955 for an output VPI.

FIG. 12 indicates a typical constitution of the VPC management table 96. In FIG. 12, reference numeral 961 stands for an ATM address, 962 for a VPC identifier, 963 for an output interface number, 964 for an output VPI, 965 for the number of idle VCIs, 966 for a default VCI, and 967 for an idle VCI pointer.

FIG. 13 gives a typical constitution of the input/output VPI/VCI mapping table 97. In FIG. 13, reference numeral 971 stands for a received VPI, 972 for a received VCI, 973 for an input interface number, 974 for an input VPI, 975 for an input VCI, 976 for status, 977 for a flow pointer.

FIG. 14 sketches a typical constitution of the idle VPI management table 98. In FIG. 14, reference numeral 981 denotes an output interface number and 982 represents an idle VPI pointer.

FIG. 15 depicts a typical constitution of the ATM routing table 99. In FIG. 15, reference numeral 991 stands for a destination ATM address, 992 for a next hop ATM address, 993 for an output interface number, 994 for an output VPI, and 995 for an output VCI.

FIG. 16 shows a typical constitution of the IP address/ATM address mapping table 110. In FIG. 16, reference numeral 111 denotes an IP address and 112 represents an ATM address.

Figure 17:
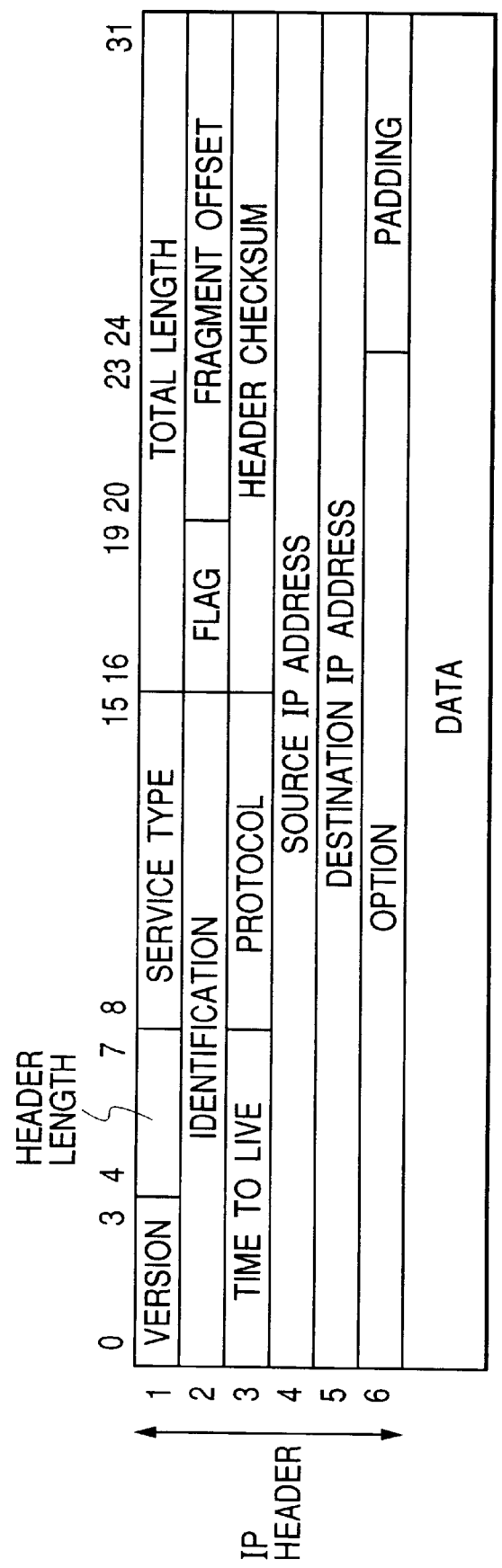
FIG. 17 is a schematic view of a typical format of an IP packet included in the control processor of FIG. 8.

FIG. 17 illustrates a typical format of an IP packet.

At the time of initialization, the network management system 5 establishes an ATM signaling channel between the control processor 9 (see FIG. 1) of a given edge node and the neighbor control processor 9 of its neighbor edge node 1. The control processor 9 receives a destination ATM address, a next hop ATM address, an output interface number, an output VPI and an output VCI reported through the signaling channel, and sets the reported data to the ATM routing table 99 (see FIG. 8).

The control processor 9 then stores a list of VPIs available over the reported lines in the idle VPI management table 98 as well as to the idle VPI memory 100. Furthermore, the control processor 9 stores in the IP address/ATM address mapping table 110 the correspondence between ATM addresses and the IP addresses assigned to all nodes on the reported network 4.

With initialization completed, the control processor 9 processes the received packets in the manner to be described below and transfers the processed packets. The control processor 9 periodically generates IP routing information and transfers the information to the control processor 9 of the neighbor node.

Figure 18:
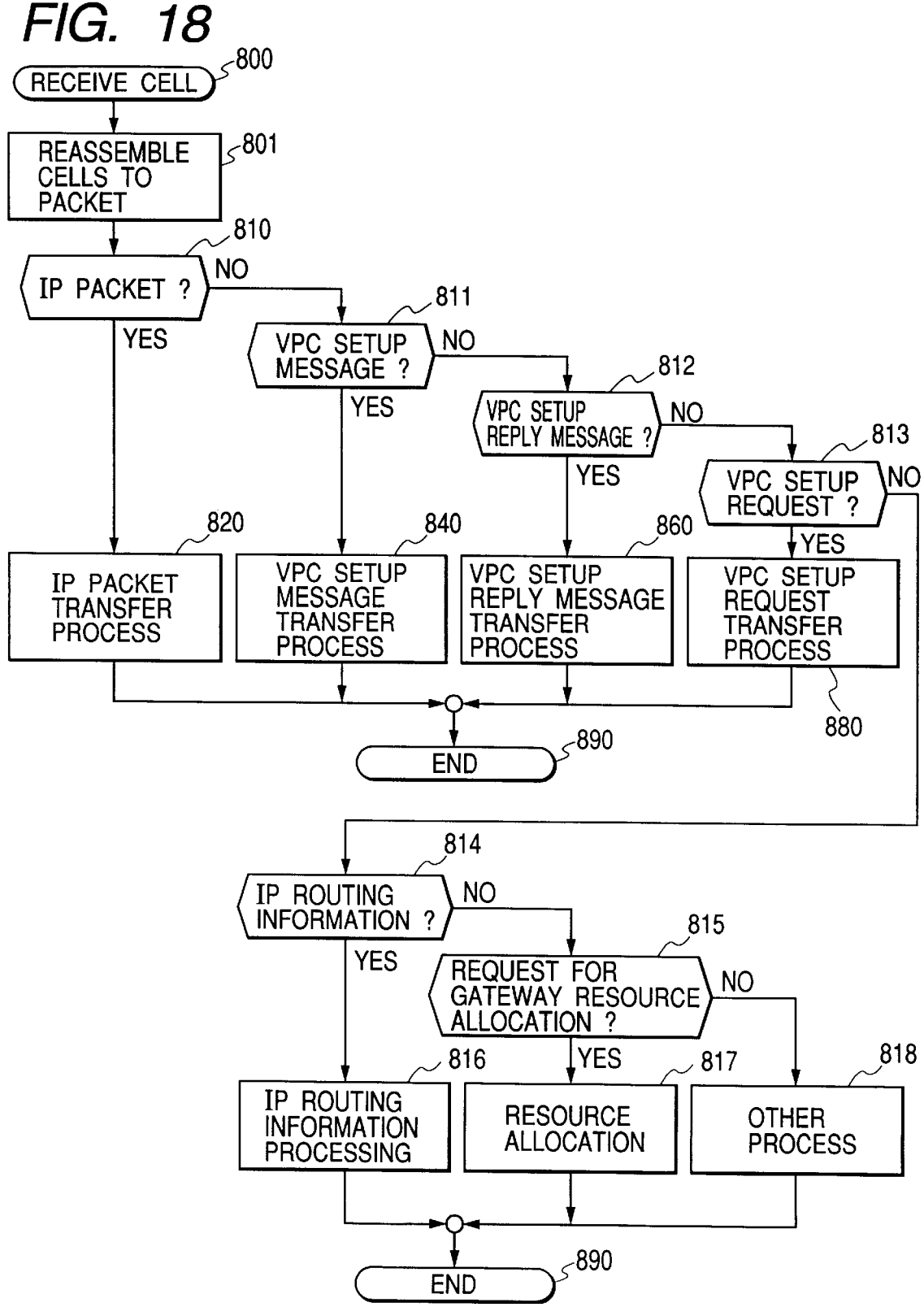
FIG. 18 is a flowchart of steps performed by the control processor of FIG. 8, depicting a packet process thereby.

How each packet is processed by the control processor 9 will now be described with reference to FIG. 18. When receiving an internal cell from the ATM switch 8 (step 800), the control processor 9 deletes from the cell the internal interface number added to the cell by the adaptation processing unit 93 so as to reassemble the ATM cells to a packet (step 801). If the received packet is found to be an IP packet (step 810), an IP packet transfer process is carried out (step 820).

If the received packet is found to be a VPC setup message (step 811), a VPC setup message transfer process is conducted (step 840). If the received packet has turned out to be a VPC setup reply message (step 812), a VPC setup reply message transfer process is performed (step 860).

If the received packet has proved to be a VPC setup request (step 813), a VPC setup reply message transfer process is carried out (step 880). If the received packet is found to be IP routing information (step 814), an IP routing information process is effected (step 816).

If the received packet is found to be a resource allocation request from the gateway 3 (step 815), a resource allocation process is performed (step 817). If the received packet does not fall into any of the above-mentioned categories, the packet is subject to other processes suitable for it (step 818).

Figure 19:
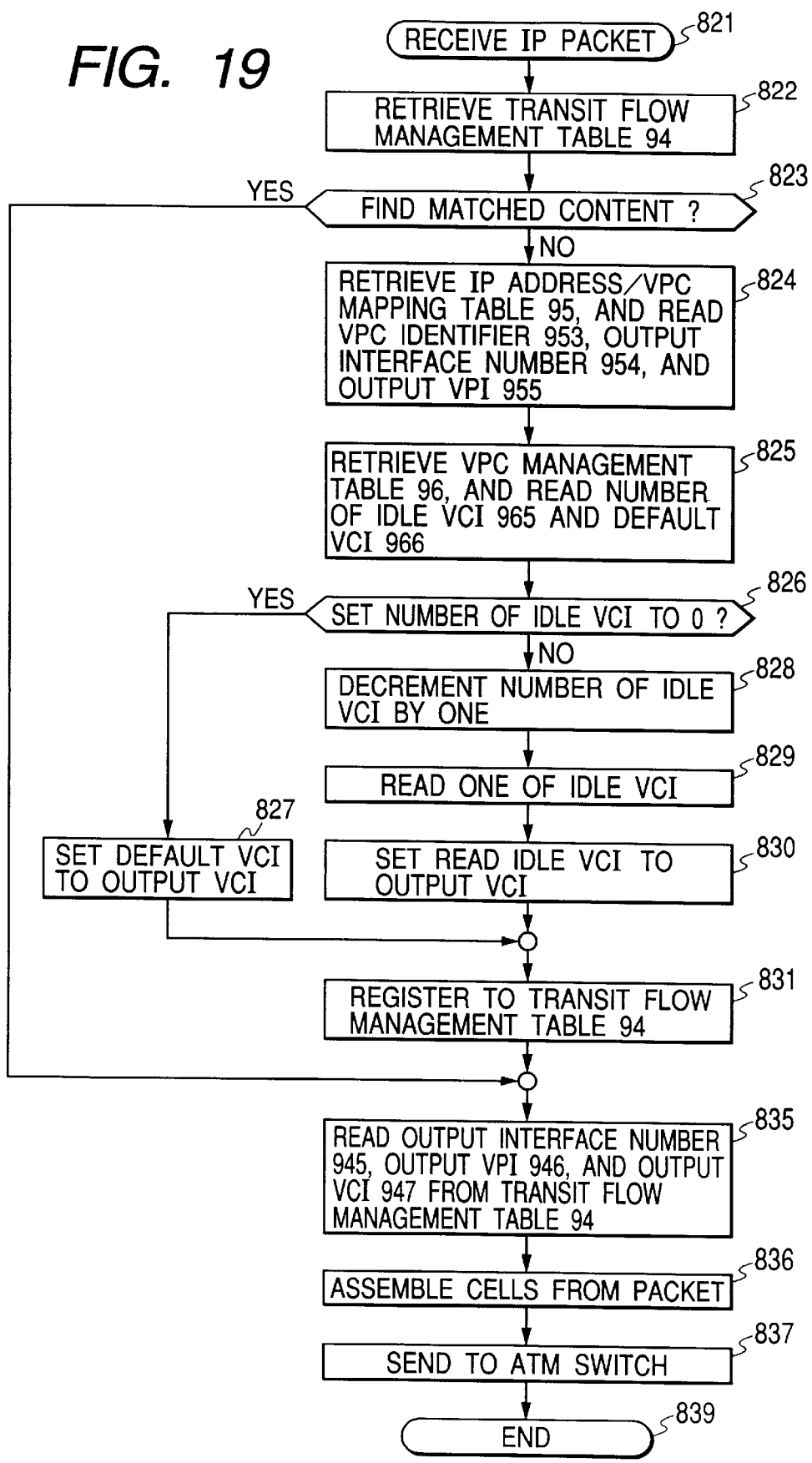
FIG. 19 is a flowchart of steps performed by the control processor of FIG. 8, detailing an IP packet transfer process thereby.

How the IP packet transfer process is performed (step 820) will now be described with reference to FIG. 19. Upon receipt of the IP packet (step 821), the processor 91 retrieves the transit flow management table 94 using the destination IP address, source IP address and port number (step 822) to check whether the table has a matching content (step 823). If a matching content is detected in the table 94, the processor 91 reads out the output interface number 945, output VPI 946 and output VCI 947 (step 835). The processor 91 assembles cells from the IP packet in question using the adaptation processing unit 93 (step 836), sets the output VPI 946 and output VCI 947 to the ATM header, adds the output interface number 945 to the ATM header, creates internal cells, and sends the created internal cells to the ATM switch 8 (step 837).

What follows is a description of how a plurality of VCCs allocated to the IP packets sharing the same header part are multiplexed on the VPC set up between the sending-side edge node 1a and the receiving-side edge node 1b on the packet route.

The processor 91 retrieves the transit flow management table 94 using the destination IP address, source IP address and port number. If the table 94 has no matching content, the processor 91 retrieves the IP address/VPC mapping table 95 using the destination IP address and port number, in order to read the VPC identifier 953, output interface number 954 and output VPI 955 corresponding to the destination IP address and port number (step 824).

The processor 91 then retrieves the VPC management table 96 using the read VPC identifier 953, so as to read the number of idle VCIs 965 and default VCI 966 (step 825). A check is made on the number of idle VCIs 965 (step 826).

If the number of idle VCIs is found to be 0, the processor 91 sets the default VCI to the output VCI (step 827). The processor 91 then registers to the transit flow management table 94 the destination IP address, source IP address and port number of the received packet; the VPC identifier 953, output interface number 954 and output VPI 955 read from the IP address/VPC mapping table 95; and the default VCI 966 read from the VPC management table 96, while the status 948 is set for "default VC being assigned" (step 831).

If the number of idle VCIs is found to be at least 1, the processor 91 decrements the number of idle VCIs 965 by one (step 828) and reads out the idle VCI pointer 967 (step 829).

The idle VCI memory 101 contains in a list structure the idle VCIs that may be used for this VPC. The starting address of the idle VCIs is written in the idle VCI pointer 967. The processor 91 reads one idle VCI from the idle VCI memory 101 using the idle VCI pointer 967, in order to update the list structure of the idle VCIs in the idle VCI memory 101 (step 830).

The processor 91 then registers to the transit flow management table 94 the destination IP address, source IP address and port number of the received packet; the VPC identifier 953, output interface number 954 and output VPI 955 retrieved from the IP address/VPC mapping table 95; and the idle VCI read from the idle VCI memory 101, while the status 948 is set for "dedicated VC being assigned" (step 831).

With the above data registered to the transit flow management table 94, the processor 91 reads out the output interface number 945, output VPI 946 and output VCI 947 therefrom (step 835). The processor 91 assembles cells from the IP packet in question using the adaptation processing unit 93 (step 836), sets the output VPI 946 and output VCI 947 to the ATM header, adds the output interface number 945 to the ATM header, creates internal cells, and sends the created internal cells to the ATM switch 8 (step 837). This completes the multiplexing of the VCCs on the VPC set up between the sending-side edge node 1a and the receiving-side edge node 1b on the packet route.

How a route changing operation (i.e., cut-through) is carried out by the edge node 1 will now be described. If the IP packet in question meets a predetermined condition (e.g., when the port number matches a predetermined value), the control processor 9 retrieves the input/output VPI/VCI mapping table 97 (see FIGS. 8 and 13) using the received VPI and received VCI set in the ATM cell header in effect upon receipt of the IP packet in question. In so doing, the control processor 9 reads the input interface number 973 in effect when the IP packet was input from the gateway 3 to this node as well as the input VPI 974 and input VCI 975 set in the ATM cell header at the time of the packet input. The control processor 9 then informs the input interface 6 corresponding to the input interface number 973 of the output VPI 946, the output VCI 947 and the output interface number 945 (see FIG. 10) allocated to this IP flow, the input VPI 974 and the input VCI 975.

Given such information, the input interface 6 stores the output interface number 945, output VPI 946 and output VCI 947 which have been informed into their corresponding regions in the header conversion table 62 (see FIG. 4). From this setup onward, a cell which is based on the same VPI and VCI and fed to the same input interface as the IP packet in question is forwarded not to the control processor 9 but to the output interface 7 corresponding to the output interface number 945.

The edge node 1 carries out its route changing operation in the manner described. That is, a cut-through cell transfer without the intervention of the control processor 9 is accomplished by the switching unit comprising the input interface 6, output interface 7 and ATM switch 8.

Below is a description of how any VCC, allocated to a series of IP packets and having become unnecessary, is released. The contents registered in the transit flow management table 94 with regard to a given IP packet are deleted as follows: the input interface 6 first informs the control processor 9 of the input interface number, input VPI, input VCI and VP switch flag 623 (see FIG. 5) in effect when the number of arrival cells is 0. In response, the control processor 9 retrieves the input/output VPI/VCI mapping table 97 (see FIGS. 8 and 13) to read the flow pointer 977. The control processor 9 then reads the VPC identifier 944, output VPI 946 and output VCI 947 from the transit flow management table 94 (see FIG. 10) pointed to by the flow pointer 977. Using the VPC identifier 944 thus read, the control processor 9 retrieves the VPC management table 96 (see FIG. 12) and increments by one the number of idle VCIs in the corresponding region. The control processor 9 also adds the output VCI read from the transit flow management table 94 to the end of the list structure in the idle VCI memory 101 pointed to by the idle VCI pointer 967, and deletes the content of the transit flow management table 94 pointed to by the flow pointer 977. This completes the release of the VCC that is no longer needed.

What follows is a description of how a VPC setup request from the network management system 5 is processed. When the received packet is found to be a VPC setup request from the network management system 5, the control processor 9 sends a VPC setup message to the node corresponding to the destination ATM address so as to establish a vPc. The VPC setup request from the network management system 5 includes such information elements as an ATM address, a VPC identifier, a QOS (Quality Of Service) type and an assigned number of VCIs of the destination node.

When the number of VPCs needed on a given network is 65,536 or less, a VPCI (Virtual Path Connection Identifier) used in ATM signaling as the VPC identifier can be used directly. If the number of VPCs required is 65,537 or greater, other VPC identifiers may be used.

The VPC setup message has information elements comprising a destination ATM address, a source ATM address, a VPC identifier, a QOS type, an assigned number of VCIs, an assigned VCI region, a default VCI, and a transit node ATM address. The processor 91 (see FIG. 8) first sets the ATM address, the VPC identifier, QOS type and assigned number of VCIs of the node 1, and the ATM address of the own node which are in the VPC setup message, respectively, to the destination ATM address, VPC identifier, QOS type, assigned number of VCIs and source ATM address.

The processor 91 then assigns as many VCIs used for this VPC as the assigned number of VCIs, and sets the value to the assigned VCI region in the setup message. On the basis of the destination ATM address, the processor 91 retrieves the ATM routing table 99 (see FIGS. 8 and 15) to read the next hop ATM address 992, output interface number 993, output VPI 994 and output VCI 995. A cell is assembled from the VPC setup message, and the read output VPI 994 and output VCI 995 are set to that cell. The processor 91 further adds the output interface number 993 to the cell before sending the cell to the ATM switch 8. This VPC setup message is transferred to the control processor 9 or 10 of the neighbor node corresponding to the destination ATM address. This completes the processing of the VPC setup request.

Figure 20:
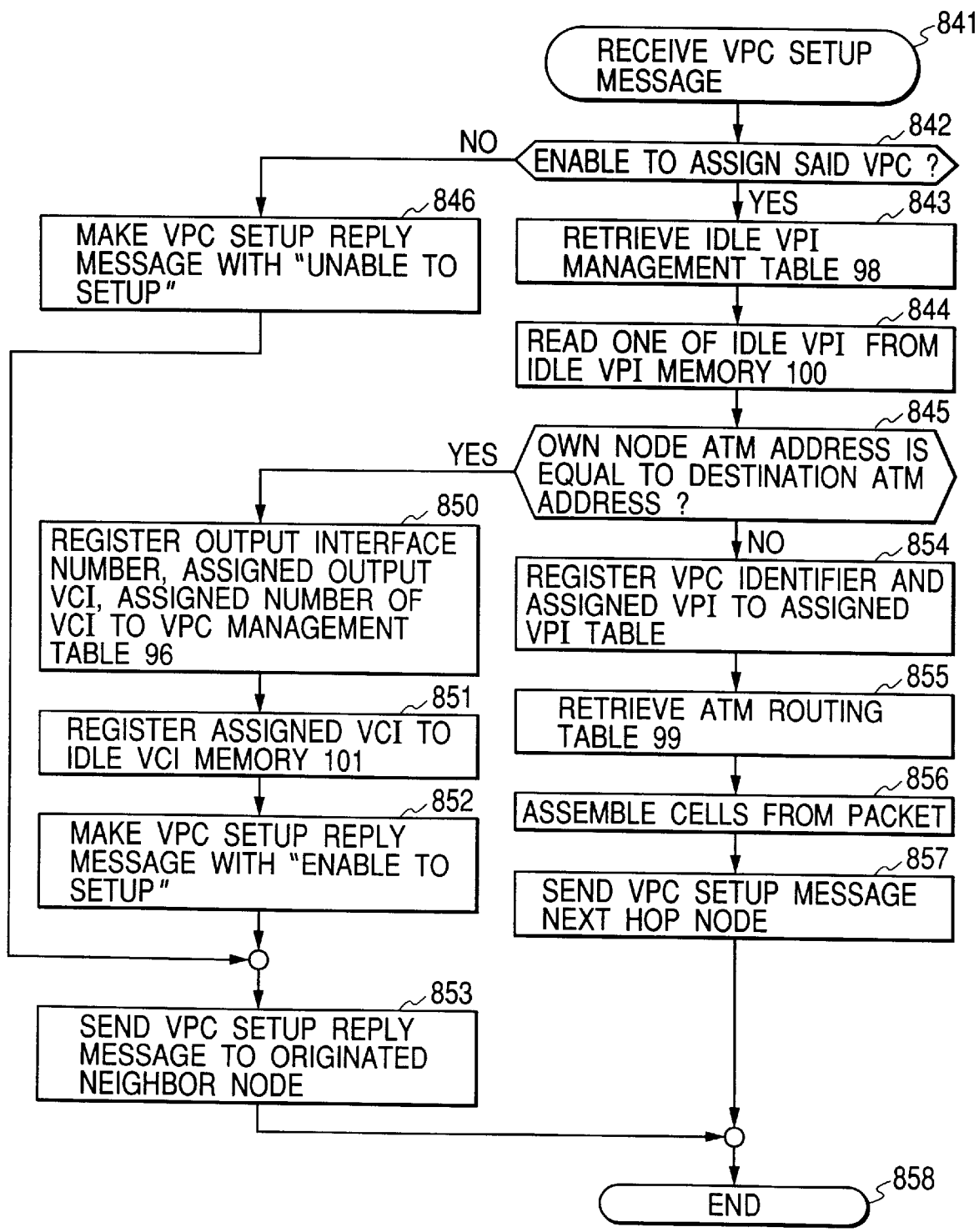
FIG. 20 is a flowchart of steps performed by the control processor of FIG. 8, detailing a VPC setup message transfer process thereby.

How the VPC setup message transfer process (step 840) is carried out will now be described with reference to FIG. 20. Upon receipt of a VPC setup message (step 841), the processor 91 checks to see if the VPC in the message is enable to be assigned (step 842). If it is enable to assign the VPC, the controller 91 retrieves the idle VPI management table 98 to obtain an idle VPI of the output interface corresponding to the line connecting the source with the own node (step 843). From the idle VPI management table 98, the controller 91 reads an idle VPI pointer 982. Using the idle VPI pointer 982, the controller 91 reads one idle VPI from the idle VPI memory 100, updates the list structure of idle VPIs in the memory 100, and assigns the retrieved VPI to this VPC (step 844).

The processor 91 then checks the destination ATM address in the VPC setup message (step 845). If the destination ATM address is found to be that of the own node, the processor 91 registers to the VPC management table 96 the source ATM address, VPC identifier and default VCI of the VPC setup message; the output interface number and assigned output VPI to which the VPC in question is set; and the assigned number of VCIs in the VPC setup message (step 850).

The processor 91 proceeds to register to the idle VCI memory 101 a list structure of the VCIs indicated by the assigned VCI region in the VCI setup message, and sets the starting address of the VCIs to the idle VCI pointer 967 in the VPC management table 96 (step 851), thereby creating a VPC setup reply message. The VPC setup reply message includes such information elements as a destination ATM address, a source ATM address, a VPC identifier, assignment availability, an assigned VPI, and a transit node ATM address.

The assignment availability is set for "available", that is, the setup reply message is made with "enable to setup" and the assigned VPI is put into the VPC setup reply message (step 852). The source address of the VPC setup reply message is set to the ATM address of the own node, and the destination address is set to the source address of the VPC setup message. The VPC identifier and transit node ATM address are copied from their counterparts in the VPC setup message. The VPC setup reply message is then informed to the control processor 9 or 10 of the source neighbor node (step 853).

If the ATM address of the own node is found to be other than the destination ATM address in step 845, the processor 91 registers the VPC identifier and assigned VPI of the VPC setup message to the assigned VPI table 120 (step 854). The ATM address of the own node is added to the transit node ATM address of the VPC setup message.

The processor 91 then retrieves the ATM routing table 99 on the basis of the destination ATM address so as to read the next hop ATM address 992, output interface number 993, output VPI 994 and output VCI 995 (step 855). The processor 91 assembles a cell from the VPC setup message (step 856), sets the read output VPI 994 and output VCI 995 to the cell, adds the output interface number 993 to the cell, and sends the cell thus prepared to the ATM switch 8. Thereafter, the processor 91 transfers the VPC setup message to the control processor 9 or 10 of the neighbor node corresponding to the destination ATM address (step 857).

If the VPC in question is found unable to be assigned in step 842, the processor 91 sets the assignment availability of the VPC setup reply message for "unavailable", that is, the setup reply message is made with "unable to setup" (step 846). In that case, the processor 91 sets the source address of the VPC setup reply message to the ATM address of the own node, and sets the destination address to the source address of the received VPC setup message. The VPC identifier and transit node ATM address are copied from their counterparts in the VPC setup message. The VPC setup reply message is then sent to the control processor 9 or 10 of the source neighbor node (step 853). This completes the VPC setup message transfer process.

Figure 21:
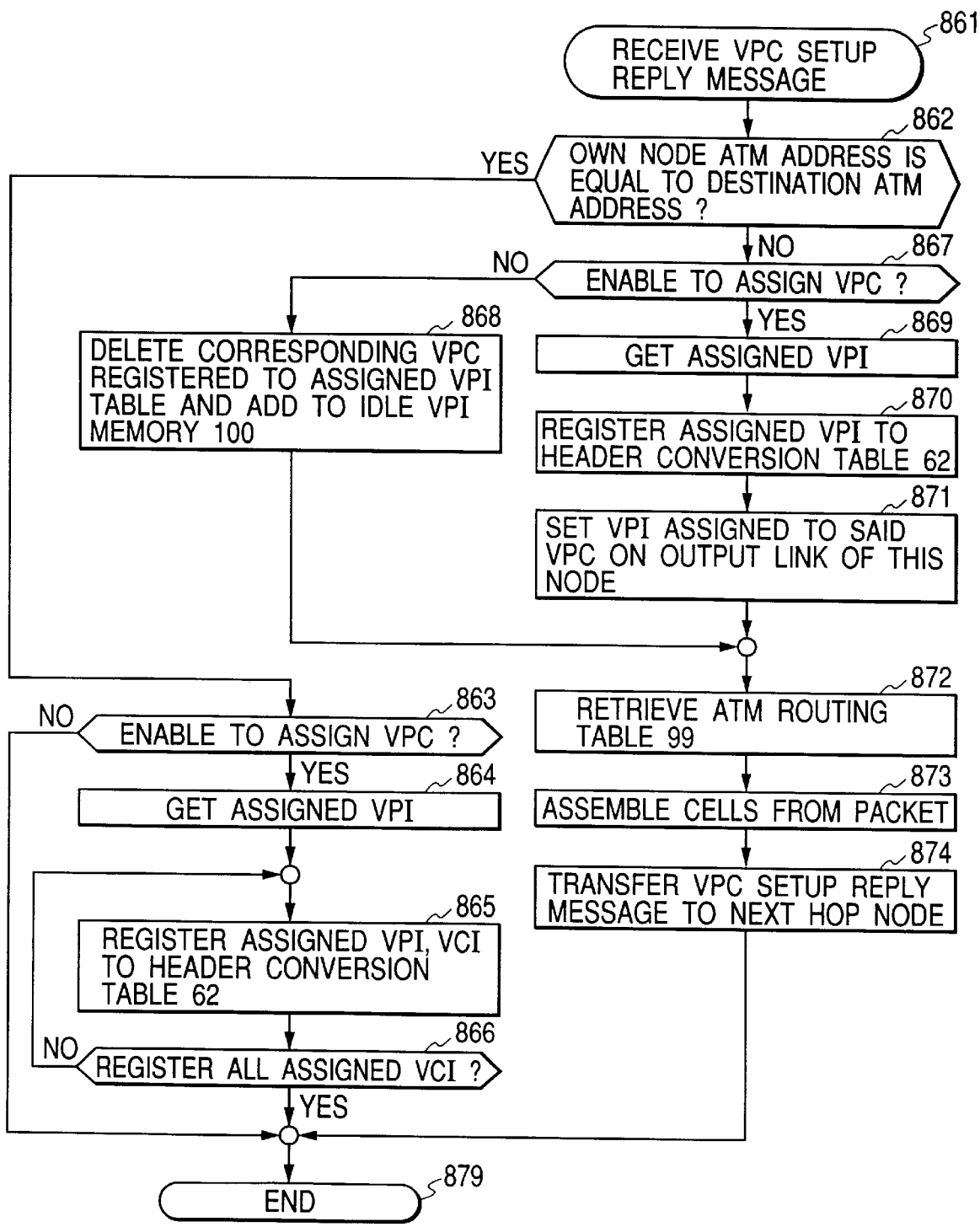
FIG. 21 is a flowchart of steps performed by the control processor of FIG. 8, detailing a VPC setup reply message transfer process thereby.

How the VPC setup reply message transfer process is performed (step 860) will now be described with reference to FIG. 21. When receiving a VPC setup reply message (step 861), the processor 91 checks the destination ATM address (step 862). If the destination ATM address is found to be that of the own node, the processor 91 checks to see if the VPC in the VPC setup replay message is enable to be assigned (step 863). If it is enable to assign the VPC, the controller 91 gets the assigned VPI from the message (step 864) and registers the route information about the VCCs available within the VPC to the header conversion table 62 (see FIG. 4) of the input interface 6 for which the VPC in question is set. The registration is carried out as follows:

The processor 91 regards the input VPI 621 in the header conversion table 62 (see FIG. 5) as the assigned VPI, and regards the input VCI 622 as one VCI previously assigned to this VPC. Output VPIs 625 and output VCIs 626 are assigned so that all values of the VPIs and VCIs for the VC input from all input interfaces to the control processor 9 differ from one another. The output interface number 624 is set as the output interface number corresponding to the control processor 9 (step 865).

The processor 91 carries out the above registration on all VCIs assigned to the VPI in question (step 866). The processor 91 proceeds to check whether the VPC is enable to be assigned in the VPC setup reply message (step 863). If the assignment is unable, the network management system 5 is informed thereof.

If the destination ATM address is found to be other than that of the own node in step 862, the processor 91 checks to see if the VPC is enable to be assigned in the VPC setup reply message (step 867). If it is enable to assign the VPC, the controller 91 gets the assigned VPI from the message (step 869). The processor 91 then sets the input VPI 621 in the header conversion table 62 (see FIGS. 4 and 5) for the input interface 6 of the VPC in question to the assigned VPI, sets the output VPI 622 to the VPI assigned previously to this VPC, sets the VP switch flag 623 to 1, and sets the output interface number 624 to the number corresponding to the output interface for which this VPC is set (step 870).

Thereafter, the processor 91 places the VPI assigned previously to this VPC into the VPC setup reply message (step 871), and retrieves the ATM routing table 99 (see FIGS. 8 and 15) on the basis of the transit node ATM address in the VPC setup reply message in order to read the next hop ATM address 992, output interface number 993, output VPI 994 and output VCI 995 (step 872). The processor 91 assembles a cell from the VPC setup reply message, sets the read output VPI 994 and output VCI 995 to the cell, and adds the output interface number 993 to the cell (step 873). The cell thus prepared is sent to the ATM switch 8, and the VPC setup replay message is transferred to the control processor 9 or 10 of the corresponding neighbor node (step 874).

The processor 91 checks the VPC setup reply message for the availability of VPC assignment (step 867). If the VPC is unable to be assigned, the processor 91 deletes the corresponding VPI registered to the assigned VPI table 120 and adds the deleted VPI to the idle VPI memory 100 (step 868). On the basis of the transit node ATM address in the VPC setup reply message, the processor 91 retrieves the ATM routing table 99 to read the next hop ATM address 992, output interface number 993, output VPI 994 and output VCI 995 (step 872). The processor 91 then assembles. a cell from the VPC setup reply message, sets the read output VPI 994 and output VCI 995 to the cell, and adds the output interface number 993 to the cell (step 873). The cell thus prepared is sent to the ATM switch 8, and the VPI setup reply message is transferred to the control processor 9 or 10 of the corresponding neighbor node (step 874). This completes the VPC setup reply message transfer process.

The VPC setup message and the VPC setup reply message can be processed by use of the ATM signaling protocol.

How IP routing information is processed will now be described. If the received packet is found to be IP routing information (see FIG. 18) (step 816), the control processor 9 sets the destination network IP address 901, mask 902, metric 903 and next hop IP address 904 in the IP routing table 90 (see FIGS. 8 and 9) on the basis of the IP routing protocol. Then the following process is carried out on each of the registration items in the IP routing table 90.

The control processor 9 first retrieves the IP address/ATM address mapping table 110 (see FIGS. 8 and 16) using the next hop node IP address 904 to read the corresponding ATM address 112. The retrieved ATM address 112 is set to the next hop node ATM address 905 (see FIG. 9).

The control processor 9 then retrieves the VPC management table 96 (see FIGS. 8 and 12) using the next hop node ATM address 112 to read the corresponding VPC identifier 962, output interface number 963 and output VPI 964. The read VPC identifier 962, output interface number 963 and output VPI 964 are set respectively to the VPC identifier 953, output interface number 954 and output VPI 955 of the corresponding registration items in the IP address/VPC mapping table 95 (see FIGS. 8 and 11). This completes the IP routing information process.

How a resource allocation request from the gateway 3 is processed will now be described. If the received packet is found to be a resource allocation request from the gateway 3 (step 817; see FIG. 18), the control processor 9 sets an idle VPI, a cut-through VCI and a default VI for the line to which the gateway 3 is connected for sending purposes. The control processor 9 then registers the VPI, cut-through VCI and default VCI to the header conversion table 62 (see FIG. 4) in the input interface 6 connected to the gateway 3. The destination output interface number corresponding to each of the information elements is set to the output interface number corresponding to the control processor 9. Output VPIs 625 and output VCIs 626 are assigned and set so that all values of the VPIs and VCIs for the VC input from all input interfaces to the control processor 9 differ from one another.

The control processor 9 also sets an idle VPI, a cut-through VCI and a default VIC for the line connected for receiving purposes. The processor 9 informs the gateway 3 of the VPI, cut-through VCI and default VCI. This completes the processing of the resource allocation request from the gateway 3.

Figure 22:
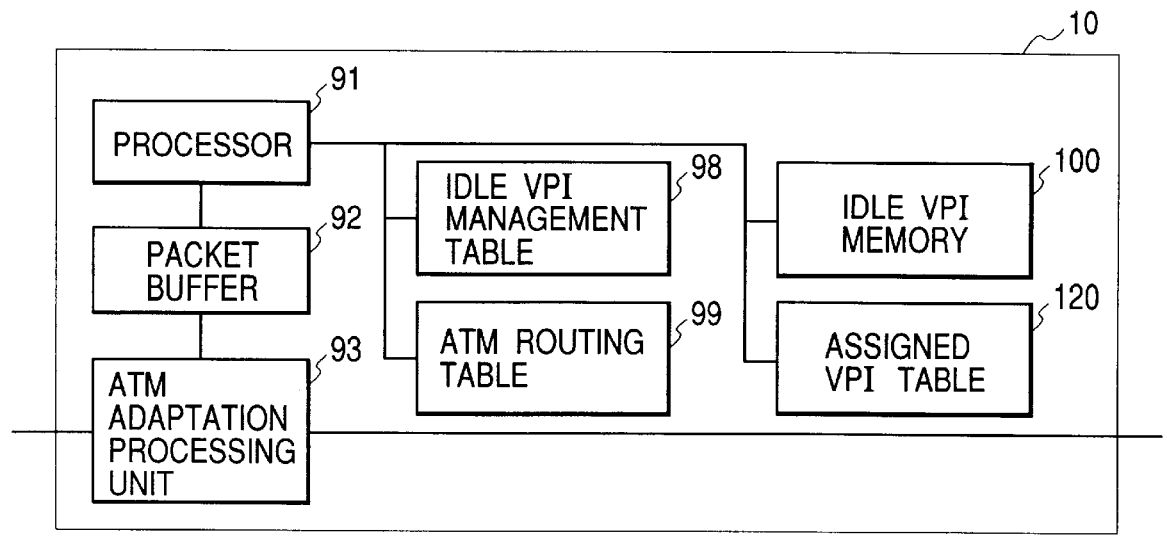
FIG. 22 is a block diagram of a control processor included in the transit node of FIG. 3.

FIG. 22 shows a typical constitution of the control processor 10. In FIG. 22, reference numeral 91 stands for a processor, 92 for a packet buffer, 93 for an adaptation processing unit, 98 for an idle VPI management table, 99 for an ATM routing table, 100 for an idle VPI memory, and 120 for an assigned VPI table. The control processor 10 operates in the same manner as the control processor 9 when the VPC setup message or VPC setup reply message is received. Because the control processor 10 is located in the transit node 2, the processor 10 does not receive any IP packet, VPC setup request or IP routing information.

Figure 23:
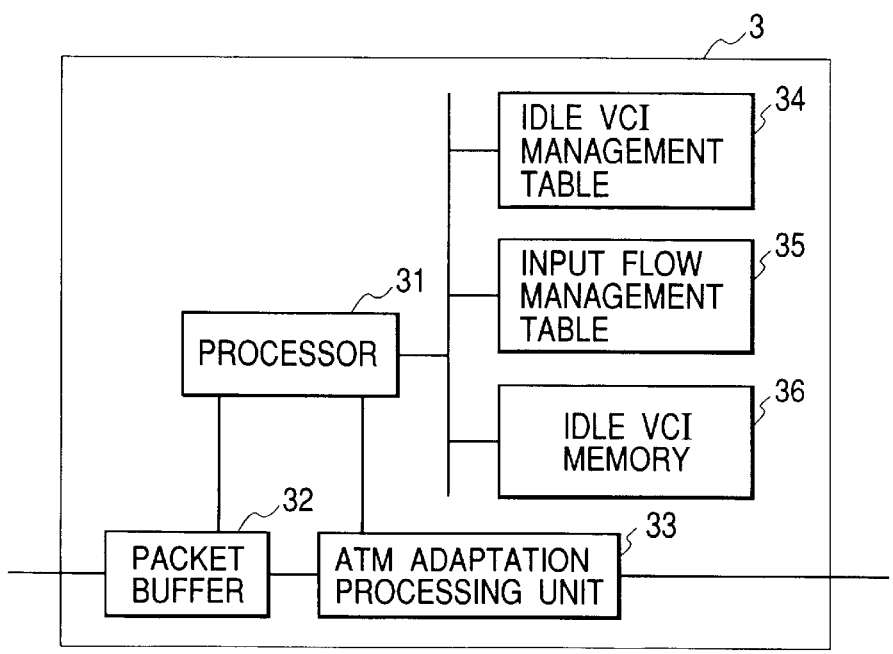
FIG. 23 is a block diagram of a typical gateway.

FIG. 23 depicts a typical constitution of the gateway 3. In FIG. 23, reference numeral 31 stands for a processor, 32 for a packet buffer, 33 for an adaptation processing unit, 34 for an idle VCI management table, 35 for an input flow management table, and 36 for an idle VCI memory.

FIG. 24 illustrates a typical constitution of the idle VCI management table 34. In FIG. 24, reference numeral 341 stands for a VPI, 342 for the number of idle VCIs, 343 for a default VCI, and 344 for an idle VCI pointer.

FIG. 25 indicates a typical constitution of the input flow management table 35. In FIG. 25, reference numeral 351 stands for a destination IP address, 352 for a source IP address, 353 for a port number, 354 for an output VPI, 355 for an output VCI, and 356 for status.

At the time of initialization, the gateway 3 outputs to the control processor 9 of the edge node 1 a request for the allocation of a VPI, cut-through VCIs and a default VCI. The VPI, the cut-through and the default VCI are used for cell transmission between the gateway 3 and the edge node 1. When the VCI, the cut-through VCIs and the default VPI are allocated by the control processor 9, the gateway 3 sets the VPI 341 in the idle VCI management table 34 (see FIGS. 23 and 24) to the VPI, sets the number of idle VCIs 342 to the assigned number of VCIS, and sets the default VCI 343 to the assigned default VCI. The gateway 3 then stores a list structure of the assigned VCIs into the idle VCI memory 36 (see FIG. 23), and registers the starting address of the list structure to the idle VCI pointer 344 in the idle VCI management table 34.

Figure 26:
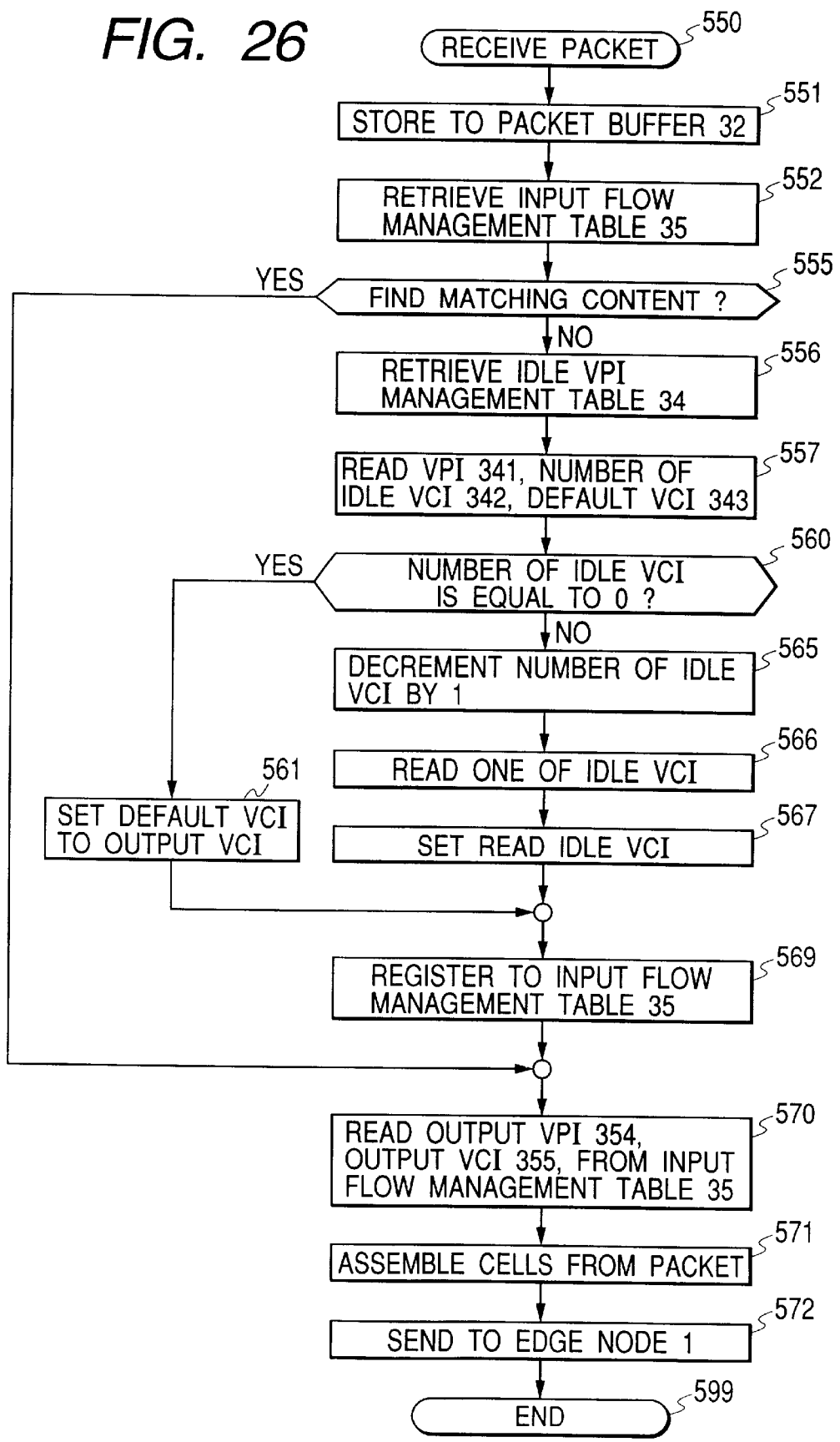
FIG. 26 is a flowchart of steps performed by the gateway of FIG. 23, detailing a packet processing thereby.

Described below with reference to FIG. 26 is how the gateway 3 processes IP packets received from the network 4b or 4c. Upon receipt of an IP packet from the network 4b or 4c (step 550), the gateway 3 stores the packet into the packet buffer 32. The processor 31 (see FIG. 23) retrieves the input flow management table 35 using the destination IP address, source IP address and port number set in the IP packet (step 552), to check whether the table 35 has a matching content (step 555).

If the input flow management table 35 is found to have a matching content, the gateway 3 reads the output VPI 354 (see FIG. 25) and output VCI 355 (step 570). The gateway 3 assembles cells from the received IP packet using the adaptation processing unit 33 (see FIG. 23). The retrieved output VPI 354 and output VCI 355 are set in the ATM header (step 571) of each of the cells, before the cells are sent to the edge node 1 (step 572).

If the input flow management table 35 is not found to have any item matching the received IP packet in step 555, the processor 31 retrieves the idle VCI management table 34 (see FIGS. 23 and 24) (step 556), to read the VPI 341, number of idle VCIs 342 and default VCI 343 (step 557).

If the number of idle VCIs 342 is found to be 0, the default VCI 343 is set as the output VCI (step 561). The gateway 3 sets to the input flow management table 35 the destination IP address, source IP address and port number of the received IP packet; and the output VPI 341 and default VCI 343 read from the idle VCI management table 34, while the status 356 is set for "default VC being assigned" (step 569).

The gateway 3 proceeds to check the number of idle VCIs 342 (step 560). If the number of idle VCIs is at least 1, the gateway 3 decrements the number of idle VCIs by one (step 565) and reads the idle VCI pointer 344. Using the read idle VCI pointer 344, the gateway 3 reads one idle VCI from the idle VCI memory 36 and updates the list structure of idle VCIs in the memory 36 (step 566).

The gateway 3 then sets the read idle VCI as the output VCI (step 567). The gateway 3 registers to the input flow management table 35 the destination IP address, source IP address and port number of the received IP packet; the output VPI 341 read from the idle VCI management table 34; and the idle VCI read from the idle VCI memory 36, while the status 356 is set for "dedicated VC being assigned" (step 569).

Upon completion of the data registration to the input flow management table 35, the gateway 3 reads the output VPI 354 and output VCI 355 (step 570). The gateway 3 assembles cells from the IP packet using the adaptation processing unit 33 (see FIG. 23). The output VPI 354 and output VCI 355 are set in the ATM header of each of the cells (step 571), before the cells are sent to the edge node 1 (step 572). This completes the packet processing by the gateway 3.

When ATM cells are received from the edge node 1, the gateway 3 reassembles the received cells to an IP packet using the adaptation processing unit 33. The IP packet to which the cells are reassembled is sent to the network 4b or 4c via the packet buffer 32.

At the time of initialization, the network management system 5 (see FIG. 2) sets up ATM signaling channel between the control processor 9 of the edge node 1a and that of the edge node 1b. The network management system 5 then registers the destination ATM address, next hop ATM address, output interface number, output VPI and output VCI corresponding to each of the edge nodes to the respective ATM routing tables 99 (see FIG. 8).

Thereafter, the network management system 5 informs the control processors 9 in the edge nodes 1a and 1b of a list of VPIs available on the lines, and of the correspondence between ATM addresses and the IP addresses assigned to all nodes on the network 4. upon initialization or in case of a network status change, the network management system 5 issues a VPC setup request to each of the control processors 9 in the edge nodes 1a and 1b.

What follows is a description of the routing procedure during initialization. When the network 4a is started up, the network management system 5 first establishes ATM signaling channel between the control processor 9 of the edge node 1a and that of the edge node 1b. The network management system 5 then registers the destination ATM address, next hop ATM address, output interface number, output VPI and output VCI corresponding to each of the edge nodes to the respective ATM routing tables 99 (see FIG. 8).

The network management system 5 issues a VPC setup request to each of the control processors 9 in the nodes 1a and 1b. It is assumed here as an example that the VPC setup request has a VPC of a QOS type 1 and a number of an assigned VCI of 16 set therein for the edge nodes 1a and 1b.

Given the VPC setup request from the network management system 5, the control processor 9 of the edge node 1b assigns the VCI for use with this VPC to create a VPC setup message, and assembles a cell from the message. The control processor 9 retrieves the ATM routing table 99. The VPC setup message is transferred to the control processor 10 (see FIG. 3) of the neighbor transit node 2a corresponding to the destination ATM address.

On receiving the VPC setup message, the control processor 10 of the transit node 2a retrieves the idle VPI management table 98 (see FIG. 22). The idle VPI for the line connecting the edge node 1b with the transit node 2a is assigned to this VPC and stored in the assigned VPI table 120. Then the control processor 10 retrieves the ATM routing table 99 on the basis of the destination ATM address, whereby the VPC setup message is transferred to the control processor 9 of the neighbor edge node 1a corresponding to the destination ATM address.

When receiving the VPC setup message, the control processor 9 of the edge node 1a finds that the destination of the message is itself and acts accordingly as follows: the control processor 9 first assigns to this VPC an idle VPI for the line connecting the transit node 2a with the edge node 1a. The processor 9 then sets the output interface number, output VPI and output VCI assigned to the VPC to the VPC management table 96 (see FIG. 8) and idle VCI memory 101. A VPC setup reply message is created, and the VPI is placed into the VPC setup reply message. The VPC setup reply message thus prepared is sent to the transit node 2a that forwarded the VPC setup message.

On receiving the VPC setup reply message from the edge node 1a, the transit node 2a gets the assigned VPI in the message, and sets to the assigned VPI the input VPI of the header conversion table 62 (see FIG. 4) in the interface 6 connected to the edge node 1a. The transit node 2a reads a VPI from the assigned VPI table 120 (see FIG. 22) using the VPC identifier as a key, sets the output VPI to the read VPI, and sets the output interface number to its counterpart in this VPC. The VPI read from the assigned VPI table 120 is placed into the VPC setup reply message before the message is informed to the control processor 9 of the neighbor edge node 1b.

Upon receipt of the VPC setup reply message from the transit node 2a, the edge node 1b gets the assigned VPI in the message to set it up as the input VPI, and regards as the input VCI the VCI previously assigned to this VPC. Output VPIs and output VCIs are assigned so that all values of the VPIs and VCIs for the VC input from all input interfaces to the control processor 9 differ from one another. The VPIs and VCIs, along with the output interface number corresponding to the control processor 9, are registered to the header conversion table 62 (see FIG. 4) for the input interface 6f in each value group. This completes the setup of the VPC between edge nodes.

How initialization takes place at the gateway 3 (see FIG. 2) will now be described. At the time of initialization, the gateway 3a sends to the control processor 9 of the edge node 1a a request for the allocation of a connection VPI, a cut-through VCI and a default VCI.

On receiving the allocation request from the gateway 3a, the control processor 9 assigns an idle VPI, a cut-through VCI and a default VCI for the line to which the gateway 3a is connected for sending purposes. The control processor 9 then registers the VPI, cut-through VCI and default VCI to the header conversion table 62 (see FIG. 4) of the input interface 6 connected to the gateway 3a. The destination output interface number corresponding to each of the information elements involved is set to the output interface number corresponding to the control processor 9. Output VPIs and output VCIs are assigned and set so that all values of the VPIs and VCIs for the VC input from all input interfaces to the control processor 9 differ from one another.

The control processor 9 also assigns an idle VPI, a cut-through VCI and a default VCI for the line connected for receiving purposes. The processor 9 informs the gateway 3a of the VPI, cut-through VCI and default VCI. In turn, the gateway 3 registers the assigned values to the idle VCI management table 34 (see FIG. 23) and idle VCI memory 36. This completes the initialization of the gateway 3.

If IP routing information is received, the control processor 9 updates the IP routing table 90 (see FIG. 8). In addition, the control processor 9 updates the IP address/VPC mapping table 95 using the address mapping table 110 and VPC management table 96.

Described below is what takes place upon arrival of a new IP packet at a gateway 3a on the network 4a. When receiving the packet, the gateway 3a retrieves the input flow management table 35. Because this packet is a new arrival and is not registered in the input flow management table 35 (see FIG. 23), the gateway 3a selects one idle VCI from the idle VCI management table 34, registers the selected VCI to the input flow management table 35, assembles cells from the packet using registered VPIs and VCIs, and sends the cells to the edge node 1a. This completes the assignment of the VCC to the IP packet.

The input interface 6 (see FIG. 1) of the edge node 1a retrieves the header conversion table 62 (see FIG. 5) on the basis of the VPI and VCI in the received ATM cell, in order to read the output interface number 624, output VPI 625 and output VCI 626. The input inter face 6 sets the output VPI 625 and output VCI 626 to the received ATM cell header, adds the output interface number 624 to the ATM cell, and forwards the ATM cell thus prepared to the ATM switch 8. The ATM switch 8 sends this ATM cell to the output interface corresponding to the output interface number 624 added to the cell.

In this packet, the destination output interface number 624 is set with respect to the output interface 7 connected to the control processor 9. This causes the received ATM cell to be sent to the control processor 9.

Upon receipt of the ATM cell, the control processor 9 (see FIG. 8) deletes from the cells the output interface number added by the adaptation processing unit 93 so as to reassemble the ATM cells to an IP packet. The processor 91 retrieves the transit flow management table 94 for a matching content. Since this packet is a new arrival, the table 94 has no matching information. The processor 91 thus retrieves the IP address/VPC mapping table 95 using the destination IP address, source IP address and port number of the received IP packet, thereby reading the destination vPc identifier. The processor 91 assigns to this IP flow one idle VCI which is gotten from the VPC management table 96 and can be used by the VPC identifier and registers the idle VCI to the transit flow management table 94.

Thereafter, the control processor 9 assembles cells from the IP packet by use of the adaptation processing unit 93. The control processor 9 sets to the ATM header of each of the assembled cells the output VPI 946 and output VCI 947 read from the transit flow management table 94 (see FIG. 10). The control processor 9 adds the output interface number 945 to the cell and turns the cell into an internal cell. The internal cell is sent to the ATM switch 8.

If the IP packet meets a predetermined condition, the control processor 9 retrieves the input/output VPI/VCI mapping table 97 for a matching content on the basis of the received VPI and received VCI found earlier in the ATM cell header upon receipt of the IP packet in question. The corresponding input interface 6 is informed of the matching content from the table 97. Then, the input interface 6 stores the output interface number 945 (see FIG. 10), output VPI 946 and output VCI 947 which are received to the corresponding regions in the header conversion table 62 (see FIGS. 4 and 5). From this setup onward, a cell fed to the same input interface as the IP packet in question on the basis of the same VPI and VCI is forwarded not to the control processor 9 but to the output interface 7 corresponding to the output interface number 945.

Route changes are carried out by the edge node in the manner described above. That is, the cut-through operation is accomplished in a way that transfers cells not through the control processor 9 but only via the switching unit comprising the input interface 6, output interface 7 and ATM switch 8.

Given the ATM cell from the control processor 9, the ATM switch 8 transfers it to the output interface 7 designated by the output interface number added to the cell. The added output interface number is deleted from the internal cell sent to the output interface 7. The cell is then sent to the transit node 2a.

On receiving the ATM cell corresponding to the VPC in question, the transit node 2a (see FIG. 3) retrieves the header conversion table 62 (FIGS. 4 and 5) of the input interface 6 on the basis of the VPI region of the received ATM cell, in order to read the output interface number 624, output VPI 625 and output VCI 626. The transit node 2a sets the output VPI 625 and output VCI 624 to the received ATM cell header, to add the output interface number 624 to the ATM cell. The ATM cell thus prepared is sent to the ATM switch 8. The ATM switch 8 transfers the cell to the output interface 7 corresponding to the output interface number added to the cell. From the output interface 7, the ATM cell is transmitted to the edge node 1b. This completes VP switching in the transit node 2.

The input interface 6 of the edge node 1b (see FIG. 1) retrieves the header conversion table 62 (see FIGS. 4 and 5) on the basis of the VPI/VCI of the received ATM cell, so as to read the output interface number 624, output VPI 625 and output VCI 626. The output VPI 625 and output VCI 626 are set to the received ATM cell header, the output interface number 624 is added to the ATM cell, and the cell thus prepared is sent to the ATM switch 8. The ATM switch 8 sends the ATM cell to the output interface 7 corresponding to the output interface number 624 added to the cell. In the case of this packet, the destination output interface number 624 is set with regard to the output interface 7 connected to the control processor 9. This causes the received ATM cell to be transferred to the control processor 9.

When sent to the control processor 9 (see FIG. 8), the cells are reassembled to an IP packet by the adaptation processing unit 93. The processor 91 retrieves the transit flow management table 94 for a matching content but finds none because this packet is a new arrival. Thus the processor 91 retrieves the IP address/VPC mapping table 95 using the destination IP address, source IP address and port number of the received IP packet, in order to read the destination VPC identifier. One idle VCI defined by the VPC identifier which is read from the VPC management table 96, is assigned to this IP flow, and registered to the transit flow management table 94.

The processor 91 assembles cells from the IP packet using the adaptation processing unit 93, sets to the ATM header of the cell the output VPI 946 and output VCI 947 read from the transit flow management table 94 (see FIG. 10), and adds the output interface number 945 to the cell to turn it into an internal cell. The internal cell thus prepared is sent to the ATM switch 8. This completes the assignment of VCCs set up between the receiving-side edge node 1b and the receiving-side gateway 3b on the packet route.

As with the edge node 1a, if the IP packet meets a predetermined condition, the edge node 1b causes its control processor 9 to instruct the corresponding input interface 6 suitably to change the content of the header conversion table 62. In this case, too, the cell fed to the same input interface as the IP packet in question with the same VPI and VCI is forwarded not to the control processor 9 but to the output interface 7 corresponding to the output interface number 945.

Route changes are thus carried out by the receiving-side edge node 1b. That is, the cut-through operation is accomplished in a way that transfers cells not through the control processor 10 but only via the switching unit comprising the input interface 6, output interface 7 and ATM switch 8.

The ATM cell sent to the output interface 7 is forwarded to the gateway 3b. Then, the gateway 3b reassembles the received ATM cells to an IP packet and outputs the reassembled IP packet onto the network 4c.

As described and according to the invention, the cut-through operation is implemented by simply establishing appropriate settings inside the configured packet switching systems. This makes it possible for the transit packet switching system, in which a large number of packets are concentrated, to switch numerous packet flows using a single VPC.

It is further understood by those skilled in the art that the foregoing description has centered on preferred embodiments of the disclosed method and devices and that various changes and modifications may be made in the invention without departing from the spirit and scope thereof.

What is claimed is:

1. A packet switching system comprising:
    switching means accommodating a plurality of input Asynchronous Transfer Mode (ATM) lines and a plurality of output ATM lines;

packet destination determining means for determining a destination of a packet on a routing protocol;

cell assembling means for assembling ATM cells from the packet;

packet reassembling means for reassembling said ATM cells to a reassembled packet;

packet assigning means for assigning the packet to one of said plurality of output ATM lines according to a content of a header of the packet;

Virtual Path Connection (VPC) setting means for setting up a VPC among a plurality of packet switching systems;

Virtual Channel Connection (VCC) allocating means for allocating an idle VCC existing in said VPC to a plurality of packets having an identical part in said content of said header; and mapping means for mapping correspondence between a packet destination address and said VPC, wherein after a first packet of said plurality of packets having the identical part in said content of said header has been transferred by said packet destination determining means, a second packet and subsequent packets of said plurality of packets having the identical part in said content of said header are switched solely by said switching means without intervention of said packet destination determining means.

2. The packet switching system according to claim 1, wherein said plurality of packets allocated to the idle VCC each have a destination identical to the others.

3. The packet switching system according to claim 1, wherein said plurality of packets allocated to the idle VCC each have a source identical to the others and a destination identical to the others.

4. The packet switching system according to claim 1, wherein said plurality of packets allocated to the idle VCC each have an application identifier identical to the others.

5. A packet switching network for switching a packet on a routing protocol comprising:

a first packet switching system; and a second packet switching system, wherein said first packet switching system comprises:
first switching means accommodating a plurality of input Asynchronous Transfer Mode (ATM) lines and a plurality of output ATM lines,
packet destination determining means for determining a destination of the packet on said routing protocol,
cell assembling means for assembling ATM cells from the packets,
packet reassembling means for reassembling said ATM cells to a reassembled packet,
first Virtual Path Connection (VPC) setting means for setting up a VPC among a plurality of packet switching systems,
mapping means for mapping correspondence between a packet destination address and said VPC, and
Virtual Channel Connection (VCC) allocating means for allocating an idle VCC existing in said VPC to a plurality of packets having an identical part in a content of a header;

wherein said second packet switching system comprises:
second switching means accommodating said plurality of input ATM lines and said plurality of output ATM lines, and
second VPC setting means for setting up said VPC among said plurality of packet switching systems;

wherein said first and second packet switching systems are located in the peripheral part and in the inner part of said packet switching network respectively; and wherein, after a first packet of said plurality of packets having the identical part in said content of said header inputted to said first packet switching system has been transferred by said packet destination determining means, a second and subsequent packets of said plurality of packets having the identical part in said content of said header inputted to said first packet switching system and said plurality of packets having the identical part in said content of said header inputted to said second packet switching system are switched solely by said first switching means and said second switching means respectively without intervention of said packet destination determining means.

6. A packet switching network for switching a packet on a routing protocol comprising:

a first packet switching system; and a second packet switching system, wherein said first packet switching system comprises:
first switching means accommodating a plurality of input Asynchronous Transfer Mode (ATM) lines and a plurality of output ATM lines,
packet destination determining means for determining a destination of the packet on said routing protocol,
cell assembling means for assembling ATM cells from the packet,
packet reassembling means for reassembling said ATM cells to a reassembled packet,
first Virtual Path Connection (VPC) setting means for setting up a VPC among a plurality of packet switching systems,
mapping means for mapping correspondence between a packet destination address and said VPC, and
Virtual Channel Connection (VCC) allocating means for allocating an idle VCC existing in said VPC to a plurality of packets having an identical part in a content of a header;

wherein said second packet switching system comprises:
second switching means accommodating said plurality of input ATM lines and said plurality of output ATM lines, and
second VPC setting means for setting up said VPC among said plurality of packet switching systems;

wherein said first and second packet switching systems are located in the peripheral part and in the inner part of said packet switching network respectively; and wherein said VPC is formed by multiplexing VCCs each having a QOS (Quality of Service) identical to the others.

7. A packet switching method for switching a packet using a packet switching system on a routing protocol, said packet switching method comprising the steps of:

storing correspondence between a destination and an output line of each of Asynchronous Transfer Mode (ATM) cells inputted to said packet switching system and a Virtual Channel Connection (VCC) into first storing means;

storing correspondence between a destination address and a Virtual Path Connection (VPC) into second storing means on said routing protocol;

storing correspondence between a part of a header of the packet and said VCC existing in said VPC into third storing means;

switching said ATM cells by use of an ATM switch based on the destination stored in said first storing means upon receipt of said ATM cells which are assembled from the packet;

reassembling said ATM cells to a reassembled packet;

retrieving said correspondence between the part of the header of the packet and said VCC from said third storing means;

assembling said ATM cells from the packet if the correspondence to the part of the header of the packet is stored in said third storing means, said ATM cells being transferred by use of said ATM switch over said VCC registered for the correspondence to the packet, which is designated as a first VCC;

retrieving said correspondence between said destination address and the VPC from said second storing means if the correspondence to the part of the header of the packet is not stored in said third storing means, wherein VPC corresponding to said destination address is assigned said VCC which is designated as a second VCC, the correspondence between the part of the header of the packet and said second VCC is stored into said third storing means, and said ATM cells are assembled from the packet and are transferred by use of said ATM switch over said second VCC;

setting said VCC that corresponds to the destination and the output line of each of said plurality of ATM cells which are assembled from the packet as a VCC for cut-through by updating said first storing means after the correspondence between the part of the header of the packet and said second VCC has been stored into said third storing means;

retrieving said correspondence between said destination and the output line from said first storing means upon receipt of said ATM cells which are assembled from the packet; and transferring said ATM cells by use of said ATM switch over said second VCC if the destination and the output line of each of said ATM cells which are received corresponds to said VCC for cut-through.

8. A packet switching network for switching a packet on a routing protocol, comprising:

a first packet switching system; and a second packet switching system, wherein said first packet switching system comprises:
first switching means accommodating a plurality of input ATM (Asynchronous Transfer Mode) lines and a plurality of output ATM lines,
packet destination determining means for determining the destination of the packet on said routing protocol,
cell assembling means for assembling ATM cells from the packet,
packet reassembling means for reassembling said ATM cells to a reassembled packet,
first VPC (Virtual Path Connection) setting means for setting up a VPC among a plurality of packet switching systems,
mapping means for mapping correspondence between a packet destination address and said VPC, and
VCC (Virtual Channel Connection) allocating means for allocating an idle VCC existing in said VPC to a plurality of packets having an identical part in a content of a header;

wherein said second packet switching system comprises:
second switching means accommodating said plurality of input ATM lines and said plurality of output ATM lines; and second VPC setting means for setting up said VPC among said plurality of packet switching systems;

wherein said first packet switching system is located in the peripheral part of said packet switching network, and said first packet switching system and said second packet switching system are located in the inner part of said packet switching network; and wherein, after a first packet of said plurality of packets having the identical part in said content of said header inputted to said first packet switching system has been transferred by said packet destination determining means, a second and subsequent packets of said plurality of packets having the identical part in said content of said header inputted to said first packet switching system and said plurality of packets having the identical part in said content of said header inputted to said second packet switching system are switched solely by said first switching means and said second switching means respectively without intervention of said packet destination determining means.

9. A packet switching network for switching a packet on a routing protocol, comprising:

a first packet switching system; and a second packet switching system, wherein said first packet switching system comprises:
first switching means accomodating a plurality of input ATM (Asynchronous Transfer Mode) lines and a plurality of output ATM lines,
packet destination determining means for determining the destination of the packet on said routing protocol,
cell assembling means for assembling ATM cells from the packet,
packet reassembling means for reassembling said ATM cells to a reassembled packet,
first VPC (Virtual Path Connection) setting means for setting up a VPC among a plurality of packet switching systems,
mapping means for mapping correspondence between a packet destination address and said VPC, and
VCC (Virtual Channel Connection) allocating means for allocating an idle VCC existing in said VPC to a plurality of packets having an identical part in a content of a header;

wherein said second packet switching system comprises:
second switching means accomodating said plurality of input ATM lines and said plurality of output ATM lines, and
second VPC setting means for setting up said VPC among said plurality of packet switching systems;

wherein said first packet switching system is located in the peripheral part of said packet switching network, and said first packet switching system and said second packet switching system are located in the inner part of said packet switching network; and wherein said VPC is formed by multiplexing VCCs having a QOS (Quality of Service) identical to the others.

first switching means accommodating a plurality of input ATM (Asynchronous Transfer Mode) lines and a plurality of output ATM lines,
packet destination determining means for determining the destination of the packet on said routing protocol,
cell assembling means for assembling ATM cells from the packet,
packet reassembling means for reassembling said ATM cells to a reassembled packet,
first VPC (Virtual Path Connection) setting means for setting up a VPC among a plurality of packet switching systems,
mapping means for mapping correspondence between a packet destination address and said VPC, and
VCC (Virtual Channel Connection) allocating means for allocating an idle VCC existing in said VPC to a plurality of packets having an identical part in a content of a header;

wherein said second packet switching system comprises:
second switching means accommodating said plurality of input ATM lines and said plurality of output ATM lines, and
second VPC setting means for setting up said VPC among said plurality of packet switching systems;
wherein said first packet switching system is located in the peripheral part of said packet switching network, and said first packet switching system and said second packet switching system are located in the inner part of said packet switching network; and
wherein said VPC is formed by multiplexing VCCs having a QOS (Quality of Service) identical to the others.

* * * * *